United States Patent
Peterson

(10) Patent No.: US 11,069,028 B2
(45) Date of Patent: Jul. 20, 2021

(54) AUTOMATED GENERATION OF ANAMORPHIC IMAGES FOR CATOPTRIC ANAMORPHOSIS

(71) Applicant: ADOBE INC., San Jose, CA (US)

(72) Inventor: John W. Peterson, Menlo Park, CA (US)

(73) Assignee: ADOBE INC., San Jose, CA (US)

(*) Notice: Subject to any disclaimer, the term of this patent is extended or adjusted under 35 U.S.C. 154(b) by 63 days.

(21) Appl. No.: 16/664,585

(22) Filed: Oct. 25, 2019

(65) Prior Publication Data

US 2021/0090213 A1 Mar. 25, 2021

Related U.S. Application Data

(60) Provisional application No. 62/905,089, filed on Sep. 24, 2019.

(51) Int. Cl.
*G06T 3/00* (2006.01)
*G06T 11/20* (2006.01)
*G06T 3/60* (2006.01)
*G06T 3/20* (2006.01)
*G06T 3/40* (2006.01)
(Continued)

(52) U.S. Cl.
CPC ........ *G06T 3/0093* (2013.01); *G02B 27/0911* (2013.01); *G06T 3/0006* (2013.01); *G06T 3/20* (2013.01); *G06T 3/40* (2013.01); *G06T 3/60* (2013.01); *G06T 11/203* (2013.01); *G06F 3/041* (2013.01)

(58) Field of Classification Search
None
See application file for complete search history.

(56) References Cited

U.S. PATENT DOCUMENTS 3,785,819 A * 1/1974 Barnes, Jr. ............. G03B 37/06
430/395
5,224,901 A * 7/1993 Dahl ....................... G09F 19/12
40/433

(Continued)

OTHER PUBLICATIONS

Yeh et al., "Anamorphic Image Generation Using Hybrid Texture Synthesis", 2018, Journal of Information Science and Engineering 34, 123-134 (2018) (Year: 2018), URL: http://graphics.csie.ncku.edu.tw/Tony/papers/JISE_art.pdf.*

(Continued)

*Primary Examiner* — David H Chu
(74) *Attorney, Agent, or Firm* — Shook, Hardy & Bacon L.L.P.

(57) ABSTRACT

Enhanced methods and systems for the automatic generation and rendering of anamorphic (e.g., curved, distorted, deformed, and/or warped) images are described. When viewed via a reflection from a non-planar (e.g., curved) surface, the automatically generated and rendered anamorphic images are perceived as being relatively non-distorted, deformed, and/or warped. The anamorphic images may be utilized for catoptric anamorphis, e.g., projective, mirrored and/or reflective anamorphic displays of images. Various artworks may employ the automatically generated anamorphic image, and the curved reflective surface to generate a relatively undistorted reflected image of the anamorphic image.

20 Claims, 10 Drawing Sheets

(51) Int. Cl.
*G02B 27/09* (2006.01)
*G06F 3/041* (2006.01)

(56) References Cited

U.S. PATENT DOCUMENTS

| | | | | |
|---|---|---|---|---|
| 2009/0015553 A1* | 1/2009 | Hirahara | ............... | G06F 3/0488 345/158 |
| 2011/0037952 A1* | 2/2011 | LaDuke | ................ | G02B 30/56 353/28 |
| 2013/0044124 A1* | 2/2013 | Reichert, Jr. | ............. | G06T 3/00 345/618 |
| 2019/0122643 A1* | 4/2019 | Ohashi | ............... | G02B 27/0172 |
| 2020/0082497 A1* | 3/2020 | Rozenberg | .............. | G06T 5/006 |
| 2020/0388075 A1* | 12/2020 | Kazanzides | ............ | A61B 90/37 |

OTHER PUBLICATIONS

DeRose, T. D., Goldman, R. N., Hagen, H., & Mann, S. (1993). Functional composition algorithms via blossoming. ACM Transactions on Graphics (TOG), 12(2), 113-135. 23 pages.

Heckbert, P. S. (1989). Fundamentals of texture mapping and image warping. 88 pages.

Peterson, J. W. (1994). Tessellation of NURB surfaces. In Graphics gems IV (pp. 286-320).

Watkins, M. A., & Worsey, A. J. (1988). Degree reduction of Bézier curves. Computer-aided design, 20(7), 398-405.

Williams, L. (Jul. 1983). Pyramidal parametrics. In Proceedings of the 10th annual conference on Computer graphics and interactive techniques (pp. 1-11). 11 pages.

* cited by examiner

AUTOMATED GENERATION OF ANAMORPHIC IMAGES FOR CATOPTRIC ANAMORPHOSIS

CROSS-REFERENCE TO RELATED APPLICATION

This application claims the benefit of U.S. Provisional Application No. 62/905,089 filed Sep. 24, 2019 and entitled "AUTOMATED GENERATION OF ANAMORPHIC IMAGES FOR CATOPTRIC ANAMORPHOSIS," the entire contents of which are incorporated by reference herein.

BACKGROUND

Artists have been creating anamorphic works for hundreds of years. Such artworks often employ a curved reflective surface and an anamorphic (i.e., distorted or warped) image of a scene rendered (e.g., printed, painted, or drawn) on a planar first surface. When the distorted image is viewed directly from the first surface, the scene may be unrecognizable. However, the scene may become recognizable when viewed via the reflective curved surface. To recognizably view the scene, the reflective surface is positioned near the first surface such that the distorted image is projected onto an image sensor (e.g., the retinas of an observer) via a reflection from the reflective curved surface. When reflected from the reflective surface, the curvature of the surface "reverses" the distortion of the image, and the observer perceives the scene as relatively distortion free.

One common type of such anamorphic artworks is cylindrical mirror art, where the curved reflective surface is a mirrored side of a cylindrical object. The first surface may be a planar surface that is positioned horizontally. The anamorphic image is rendered around a specific point on the plane of the first surface, such that the distorted image may be considered to have at least an approximate "center" or central point. The center of the distorted image may not be included in the "bounds," "perimeter," "boundary," or "footprint" of the distorted image. The cylinder is positioned such that the axis of the cylinder is vertical, the center of the cylinder's base is aligned with the "center" of the distorted image, and the cylinder's base rests on the horizontal planar first surface. The relatively undistorted image may be viewed via a reflection from the vertical mirrored side of the cylinder. In other artworks, the reflective surface may be the mirrored side of a conical object. In still other artworks, the reflective surface may be a mirrored spherical (or hemispherical) object. During the rendering of the distorted image on the first surface, the artist must consider the shape, curvature, reflective properties, and intended relative positioning of the non-planar reflective surface. That is, the artist must render the distorted image such that the reflective surface at least approximately reverses the distortion.

Traditionally, artists have rendered the distorted (or anamorphic) image on the first surface by positioning the reflective surface near the first surface such that they may view the first surface via reflection from the reflective surface. While viewing the reflective surface, the artist may draw the distorted image on the first surface and observe the "undistorted" or "distortion-reversed" version of the scene via the reflection. This process may be manually and mentally taxing, because the artist must develop a "distorted" cognitive map to guide their hand in drawing the distorted image while viewing the undistorted scene. Thus, such artworks require significant artistic specialization, skill, talent, and effort to produce. In addition to being manually and mentally intensive, if an artist misjudges the "reverse-distorting" effects of the reflective surface or makes another type of artistic judgment error when rendering the distorted image, the artistic effect of the curved reflective surface reversing the distortion may be destroyed such that the reflected image still appears relatively distorted. Thus, the manually created work may have little artistic value.

SUMMARY

The technology described herein is directed towards enhanced methods and systems for the automated generation of anamorphic images for catoptric anamorphosis (e.g., reflective anamorphic artworks). The anamorphic images may be rendered on a planar display surface (DS) that is characterized by a set of DS properties. In one non-limiting embodiment, source image data may be received. The source image data may encode a source image of a scene. The source image may conform to a polygonal source footprint that is characterized by a source aspect ratio. A set of rendering parameters and a set of reflected parameters may be determined based on the source footprint, the set of DS properties, and a reflective radius of curvature of a reflective surface (RS). The set of rendering parameters may characterize a rendering area of the DS bounded via a non-polygonal perimeter. An image transformation may be generated based on the set of rendering parameters, the reflected parameters, and/or the source footprint. Anamorphic image data may be generated. The anamorphic image data may encode an anamorphic image of the scene. The anamorphic image data may be generated via an application of the image transformation on the source image. The anamorphic image may conform to a non-polygonal anamorphic footprint that is substantially equivalent to the non-polygonal perimeter. The anamorphic image data may be employed to cause a rendering of the anamorphic image within the rendering area of the DS. The non-polygonal perimeter may bound the rendered anamorphic image. When the RS is positioned proximate a specified location, the RS may reflect the anamorphic image such that a reflected image of the scene is received at a viewing angle. The reflected image may conform to a polygonal reflected footprint that is characterized by the source aspect ratio. In some embodiments, the RS may be a reflective side surface of a cylindrical object. The source footprint is a first rectangular footprint. The anamorphic footprint may be an annulus sector footprint. The reflected footprint may be a second rectangular footprint.

DETAILED DESCRIPTION

Figure 1:
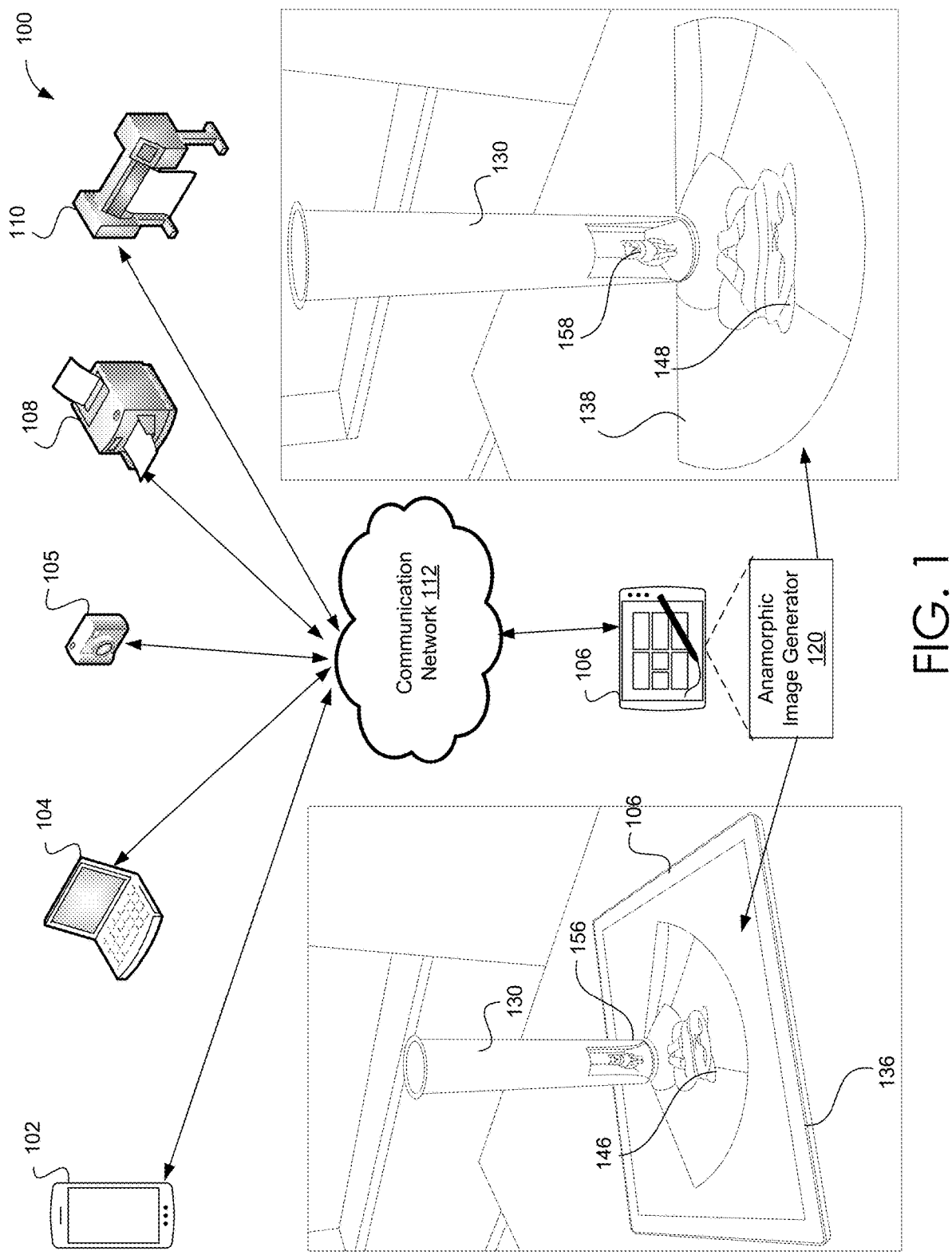
FIG. 1 illustrates an enhanced catoptric anamorphosis system implementing various embodiments presented herein.

Cylindrical anamorphic projections are a fascinating form of art that has been practiced for over two hundred years. Conventionally, these works (e.g., anamorphic and/or distorted images) are painstakingly created by artists who paint the anamorphic image while focusing on a reflection of the anamorphic image in a cylindrical mirror. When viewed without the aid of the cylindrical mirror, the resulting artwork (e.g., the anamorphic image) is full of distortions. However, when the artwork is viewed via a reflection from the cylindrical mirror (or some other reflective surface with a similarly curved geometry) placed at an appropriate location, the cylindrical mirror "reverses" the distortions painstakingly created by the artist, and an undistorted image of the artwork magically comes into focus.

When creating distortions, human artists may err and create a distorted artwork that is not adequately reversed by the cylindrical mirror. For example, due to errors in the painstaking manual labor required to conventionally create an anamorphic artwork, some conventionally created anamorphic artworks do not, under reflection by the cylindrical mirror, appear adequately undistorted. That is, some conventionally created anamorphic artworks do not provide the artistic effect intended by the artist. To ensure achievement of the intended artistic effect (e.g., the reflected rendering of the artwork as relatively undistorted), to decrease the painstaking labor required by the artist, and to address other limitations associated with conventionally created anamorphic artworks, the various embodiments are directed towards the automatic generation of anamorphic images based on objective features of an undistorted source image, a surface for which to render the anamorphic image on, and a reflective surface (e.g., cylindrical mirror) for which to reflect the anamorphic image from. In some embodiments, the automatic generation and rendering of an anamorphic image is further based on one or more distorted image rendering and/or mapping methods, such as but not limited to Bezier patch deformations, polar mapping, or the like.

Briefly, the embodiments may receive a source image that is a non-distorted (e.g., a non-anamorphic) image and has a rectangular "bounding box." Based on features, characteristics, properties, and/or parameters of the source image, a selected surface for which to render a distorted (e.g., anamorphic) version of the source image (e.g., an anamorphic image), a reflective surface for which to reflect the anamorphic image from (e.g., a cylindrical mirror), a non-rectangular bounding "box" for the anamorphic image may be determined. For example, the non-rectangular bounding "box" of the anamorphic image may be a section of an annulus. A deformation mapping (e.g., a Bezier patch deformation or a polar mapping) of the source image (with the rectangular bounding box) to the anamorphic image (with the non-rectangular bounding "box") may be employed to render the anamorphic image on the selected surface. The reflective surface may be positioned at an appropriate location, such that the anamorphic image is reflected from the reflective surface, and the reflected image appears relatively undistorted, as compared to the anamorphic image.

More particularly, the various embodiments of the technology described herein are directed towards enhanced methods and systems for the automatic generation and rendering of anamorphic (e.g., curved, distorted, deformed, and/or warped) images, that when viewed via a reflection from a non-planar (e.g., curved) surface, are perceived as being relatively non-distorted, deformed, and/or warped. For example, the embodiments may be employed for the automatic generation of anamorphic images. The anamorphic images may be utilized for catoptric anamorphis, e.g., projective, mirrored and/or reflective anamorphic displays of images. In at least some embodiments, various artworks may employ the automatically generated anamorphic image, and the curved reflective surface to generate a relatively undistorted reflected image of the anamorphic image.

In the various embodiments, a source image depicting a scene may be received, via encoding source image data. Anamorphic image data (encoding an anamorphic image) may be automatically generated based on the source image data. The anamorphic image visually depicts the scene of the source image, but in contrast to the source image, the visual depiction of the scene is a distorted and/or deformed version of the scene. That is, the scene, as visually depicted in the anamorphic image, appears embedded in a curved space and projected onto the plane of the anamorphic image. Thus, the scene, as depicted in the anamorphic image visually appears as a distorted scene. The anamorphic image may be rendered on a planar display surface (DS), e.g., a display device, paper, canvas, and the like. A curved reflective surface (RS) may be employed to "reverse" the curvature and/or the distortion of the anamorphic image, such that when the rendering of the anamorphic image is reflected from the RS, a reflected image is formed that visually depicts the scene as relatively undistorted, as compared to the distorted depiction in the anamorphic image. That is, the absolute value of the curvature associated with the reflected image may be less than the absolute value of the curvature associated with the anamorphic image.

In addition to being based on the source image data, the automatic generation of anamorphic image data and rendering of the encoded anamorphic image is based on one or more properties of the DS (the physical dimensions of the DS) and one or more properties of the RS. The one or more properties of the DS includes geometrical properties of the DS (e.g., a height and a width of the DS). The one or more geometrical properties of the DS may be encoded in values of a set of DS property parameters. The one or more properties of the RS includes geometrical properties of the RS (e.g., a radius of curvature of the RS). The one or more geometrical properties of the RS may be encoded in values of a set of RS property parameters. Thus, the various embodiments are employed for the generation of anamorphic artworks visually depicting a scene, where the distortion and/or deformation of the scene (required for catoptric anamorphosis) is automatically determined based on the geometries of the DS and RS. The distorted anamorphic image is rendered on the DS and the reflection of the anamorphic image from the RS accurately depicts the scene with only a small amount of distortion.

In some embodiments, the RS is a reflective side of a cylindrical object. That is, cylindrical anamorphic artwork is automatically generated by some embodiments. Although many of the embodiments discussed herein are directed towards reflective cylindrical geometries, other embodiments are not so limited, and other reflective curved geometries may be considered. For example, at least some of the embodiments discussed herein may be generalized to conical, spherical, elliptical, hyperbolic, and other such curved reflective geometries. In some embodiments, the DS may be paper, canvas, or other such mediums. That is, rendering the anamorphic image may include employing a printer, plotter, printing press, or other such devices to render the anamorphic image on any medium that such devices render upon. In other embodiments, the DS is a display device of a computing device (e.g., a tablet, smartphone, laptop, or other computing device where the display may be positioned horizontally), and the anamorphic image is directly displayed on the display. For instance, if the anamorphic image is displayed on a touch-sensitive display device of a tablet. The tablet is set upon a table or other supporting structure. The reflective object is set directly upon the horizontally positioned display device (or to the side of the display device).

The set of rendering parameters is employed to define an image data transformation. For instance, the image data transformation may be a non-affine transformation employed to transform the source image to the anamorphic image. Via an application of the image data transformation to the source image data, the anamorphic image data may be generated.

In one non-limiting embodiment, source image data may be received. The source image data may encode a source image of a scene. The source image may conform to a polygonal source footprint that is characterized by a source aspect ratio. A set of rendering parameters and a set of reflected parameters is determined based on the source footprint, the set of DS properties, and a reflective radius of curvature of a reflective surface (RS). The set of rendering parameters may characterize a rendering area of the DS that is bound via a non-polygonal perimeter. An image transformation may be generated based on the set of rendering parameters, the reflected parameters, and/or the source footprint. The generated anamorphic image data encodes an anamorphic image of the scene. The anamorphic image data is generated via an application of the image transformation on the source image. The anamorphic image conforms to a non-polygonal anamorphic bounds that is substantially equivalent to the non-polygonal perimeter. The anamorphic image data is rendered within the area of the DS. The non-polygonal perimeter bounds the rendered anamorphic image. When the RS is positioned proximate a specified location, the RS reflects the anamorphic image such that a reflected image of the scene is received at a viewing angle. The reflected image may conform to a polygonal reflected footprint that is characterized by the source aspect ratio. In some embodiments, the RS may be a reflective side surface of a cylindrical object. The source footprint is a first rectangular footprint. The anamorphic footprint may be an annulus sector footprint. The reflected footprint may be a second rectangular footprint.

The image transformation is a non-affine image transformation that maps a 2D source image to a curved anamorphic image via a continuous or a non-continuous deformation (e.g., a homeomorphism of the source image into the anamorphic image). As noted throughout, the source image conforms to a polygonal footprint (e.g., a rectangular shaped footprint), and via the application of the image transformation, the anamorphic image conforms to a non-polygonal (e.g., an annulus sector footprint). In various embodiments, the image transformation may employ parametric patch deformations. Various embodiments of image transformations that employ parametric patch deformations are described in U.S. patent application Ser. No. 16/141,226, entitled "GENERATING ENHANCED DIGITAL CONTENT USING PIECEWISE PARAMETRIC PATCH DEFORMATIONS," filed on Sep. 25, 2018, the contents of which are incorporated herein in entirety. Any of the various embodiments of image transformations described in the above noted patent application are employed to deform a source image into a curved anamorphic image. For example, the image transformation may employ multiple Bézier patch transformations, as described in the above noted patent application. Other embodiments are not so limited and other types of image transformation may be employed. For example, in embodiments that employ a cylindrical reflective geometry, where the rendering area for the anamorphic image is shaped as an annulus sector, polar mapping may be employed to map the source image, conforming to a rectangular footprint, to the anamorphic image, conforming to the annulus sector footprint.

As used herein, the term "image data" may refer to structured or unstructured data. The image data may encode an image. The term "data pixel" (or simply "pixel") may refer to discretized data elements included in image data. Thus, image data may include a set of data pixels (or simply a set of pixels). The term "image pixel" may refer to a discretized region of the encoded image. Each pixel of the image data may correspond to an image pixel of the encoded image. Thus, there may exist a mapping between the data pixels (or simply pixels) of the image data to image pixels of the encoded image. The mapping may be a one-to-one mapping.

As used herein, the terms "line segment," "linear segment," or "non-curved segment" may be used interchangeably to refer to a one-dimensional (1D) object or element with a radius of curvature that may be approximated as positively or negatively infinite. A line segment may be characterized by a first point (e.g., a point of origin) and a second point (e.g., a point of terminus), where a Euclidean line connects the point of origin and the point of terminus. Thus, a line segment includes the origin point, the terminus point, and point that is collinear with the origin point and the terminus point, while being intermediate the origin point and the terminus point. The length of the line segment may be specified via a Euclidean norm or distance (e.g., an $L^2$ norm) between the origin and terminus of the line segment, e.g., the length of the line segment connecting the origin and terminus. A line segment with a length equivalent to 1 may be referred to as a unit line segment.

In contrast to a line segment, the terms "curved segment," or "non-linear segment" may be used interchangeably to refer to a 2D object or element with a (constant or variable) radius of curvature that may not be approximated as positively or negatively infinite. A curved segment with constant radius of curvature may be referred to as an "arc segment," Similar to a line segment, a curved segment may also have a point of origin and a point of terminus. The non-linear curve of a curved segment may connect the point of origin to the point of terminus. The curved segment includes the origin point, the terminus point, and each point along the non-linear curve connecting the origin point and the terminus point. The curve may be, but need not be, of an arbitrary shape. Because the curve may be an arbitrary shape, the radius of curvature of the curved segment may vary across the curve. However, in other embodiments (e.g., for circular or circular sector curved segments), the radius of curvature of the curve may be constant. The length of the curved segment may be the length of the non-linear curve connecting the origin to the terminus. A curved segment of a constant radius of curvature (e.g., an arc segment) is characterized the constant radius of curvature and a center of curvature. In some embodiments, a curved segment of constant radius (e.g., a circular sector curved segment) may be additionally characterized by a sweep or opening angle from the point of origin to the point of terminus, where the sweep angle is formed at the center of curvature. Because the curve need not be of curvature, the radius of curvature (e.g., the inverse of the curvature) of a curved segment may vary as a function of position on the curved segment.

An image may have a "footprint," or equivalently "bounds." The terms footprint, bounds, or boundary may be used interchangeably throughout to refer to the shape of the perimeter (or boundary) of an image. That is, the shape of a perimeter (e.g., the footprint, the bounds, or the boundary) of the image may be constructed from one or more (non-curved) line segments and/or one or more curved segments. An image may be said to "conform" to the shape of its footprint or shape of its perimeter. In some embodiments, the footprint (or bounds) of an image may be a 2D planar footprint that may be constructed from one or more line segments and/or one or more curved segments. The footprint (or bounds) defines a 2D area of the image that conforms to the footprint. Such image footprints that are constructed from only (non-curved) line segments may be referred to as "polygonal" footprints (or equivalently as polygonal bounds and/or polygonal boundaries). Polygonal image footprints may include triangular footprints, quadrilateral footprints, pentagonal footprints, hexagonal footprints, and the like. Note that a polygonal image footprint need not be a regular polygon. Quadrilateral image footprints may include parallelogram footprints, trapezoidal footprints, and the like. Parallelogram image footprints may include square footprints, rectangular footprints, rhombus footprints, and the like. Note that an image with a polygonal footprint may conform to, or have a perimeter of, any arbitrary shape that is comprised of all line segments, i.e., the shape of the perimeter may not include a single curved segment.

In some non-limiting embodiments, an image may have a rectangular footprint and/or bounds. A rectangular footprint may be referred to as a "rectangular bounding box," "bounding box," and/or "bounding rectangle" of the image. A rectangular image footprint (i.e., a rectangular bounding box or bounding rectangle) may be constructed from a first line segment, a second line segment that is substantially orthogonal to the first line segment, a third line segment that is substantially parallel to the first line segment, and a fourth line segment that is substantially parallel to the second line segment. The origin of the second line segment may be substantially coincident with the terminus of the first line segment, forming a substantially right angle with the first line segment. The origin of the third line segment may be substantially coincident with the terminus of the second line segment, forming a substantially right angle with the second line segment. The origin of the fourth line segment may be substantially coincident with the terminus of the third line segment, forming a substantially right angle with the third line segment. The origin of the first line segment may be substantially coincident with the terminus of the fourth line segment. The length of the first and third line segments may be substantially equivalent and may be referred to as the image height. The length of the second and fourth line segments may be substantially equivalent and may be referred to as the image width. Thus, the Euclidean distance between the substantially parallel first and third line segments may be substantially equivalent to the image width. The Euclidean distance between the substantially parallel second and fourth line segments may be substantially equivalent to the image height. The center of the rectangular footprint may be the geometrical center of the rectangular shape formed by the rectangular footprint. More specifically, the center of a rectangular footprint may be the center point of a line segment that connects the center point of the first line segment to the center point of the third line segment. Equivalently, the center of the rectangular footprint may be the center point of a line segment that connects the center point of the second line segment to the center point of the fourth line segment.

Thus, the bounds of a rectangular image may be characterized by a first linear dimension (e.g., the image height), a second linear dimension (e.g., the image width), and the center of the rectangular foot. A linear dimension may be specified in spatial units of measure (e.g., meters) or in a number of pixels measure (e.g., 1024 pixels). A spatial unit of measure for an image height or image width may be converted to a pixel unit specification (and vice versa) through a pixels per spatial unit conversion faction (e.g., number of pixels per inch). The term "aspect ratio" of an image with a rectangular footprint may refer to a ratio of the image height to the image width. A square image footprint may be a rectangular image footprint where the image height is substantially equivalent to the image width. That is, a square image may be a rectangular image with an aspect ratio substantially equivalent to 1.

In contrast to polygonal image footprints, any image footprint that includes one or more curved segments may be referred to as a "non-polygonal" image footprint or "curved" image footprint. The terms non-polygonal bounds, non-polygonal boundary, curved bounds, and/or curved boundary may be used interchangeable with non-polygonal footprint and/or curved footprint. In addition to at least one curved segment, a non-polygonal image footprint may include one or more non-curved line segments. Such non-polygonal image footprints may include a circular (or sector or slice thereof) footprint, an elliptical footprint (or sector or slice thereof), an annular (or sector or slice thereof) footprint, and the like. For example, a non-polygonal footprint may include a circular sector footprint, an elliptical sector footprint, an annulus sector footprint, or a combination thereof. Note that an image with a non-polygonal footprint may conform to, or have a perimeter of, any arbitrary shape that is comprised of at least one curved segment, i.e., to construct the shape of the perimeter, at least one curved segment must be employed.

One embodiment of a non-polygonal image footprint, or non-polygonal boundary may be an annulus sector (or annular) footprint and/or an annulus sector (or annular) bounds. An annulus sector footprint and/or annulus sector boundary may be equivalently referred to as a annulus sector boundary. A non-limiting embodiment an annulus sector footprint and/or annulus sector bounds is shown in conjunction with at least FIG. 3.

Thus, an annulus sector footprint may be characterized by an inner radius, an outer radius, a sweep (or opening) angle, and a center. The sweep angle of an annulus sector image footprint may be greater than 0 and less than or equal to 2π. An annulus image footprint may be constructed from an inner circular footprint and an out circular footprint, where the inner and outer circular footprints are concentric circular footprints. Thus, an annulus image footprint may be a circular section footprint with a sweep angle of 2π. A circular footprint may be formed from an annulus footprint with an inner radius substantially equivalent to 0.0. Thus, a circular sector footprint may be constructed from an annulus sector footprint with an inner radius substantially equivalent to 0.0.

An "anamorphic image" refers to an image, that when viewed as a reflection from and/or projection onto a surface (e.g., a reflective or projective surface) appears less curved, deformed, distorted, or warped than a rendering of the anamorphic image. The reflective and/or projective surface may be a curved surface. So when viewed as a reflection from a reflective and/or projective surface, the curvature of the reflective or projective surface "reverses" the deformation, distortion, or warping of the anamorphic image. In various embodiments, the curvature of an anamorphic image is based on the curvature of the reflective and/or projective surface, such that the reflective and/or projective surface may "compensate" for, and/or reverse, at least some of the curvature of the anamorphic image. Thus, when reflected from a reflective and/or projective surface, the reflected image depicts the scene of the anamorphic image as less curved, deformed, distorted, or warped. The reflected image has less curvature than the anamorphic image. Because anamorphic images are often viewed as a reflection, the scene depicted in the anamorphic image may be a mirrored reflection (e.g., an "inside out" reflection) of the scene viewed in the anamorphic image.

Example Operating Environment

FIG. 1 illustrates an enhanced catoptric anamorphosis system 100 implementing various embodiments presented herein. System 100 includes one or more various computing devices, such as but not limited to mobile smartphone computing device 102, laptop computing device 104, camera computing device 105, tablet computing device 106, printer computing device 108, and plotter computing device 110. Various embodiments of a computing device, such as but not limited to computing devices 102-110 are discussed in the context of computing device 900 of FIG. 9. Computing devices 102-110 may be communicatively coupled via communication network 112. Any of computing devices 102-110 may host, implement, and/or operate any of an anamorphic image generator 120.

Communication network 112 may be a general or specific communication network and may communicatively couple at least a portion of computing devices 102-110, enhanced recommendation engine 140, and any database included in database 120. Communication network 112 may be any communication network, including virtually any wired and/or or wireless communication technologies, wired and/or wireless communication protocols, and the like. Communication network 112 may be virtually any communication network that communicatively couples a plurality of computing devices and storage devices in such a way as to computing devices to exchange information via communication network 112.

In the non-limiting embodiment illustrated in FIG. 1, tablet computing device 106 is hosting the anamorphic image generator 120. However, other computer devices, including but not limited to computing devices 102-110 may implement an embodiments of anamorphic image generator 120. In some embodiments, anamorphic image generator 120 may operate as a server application and be implemented on one or more server computing devices not shown in FIG. 1. In such an embodiment, any of client computing devices 102-110 may host, implement and/or operate a client application that corresponds to the server version of the anamorphic image generator 120, e.g., system 100 may implement a client/server architecture.

Anamorphic image generator 120 may generate an anamorphic image data, based on received source image data. The source image data may encode a source image that visually depicts an undistorted scene (e.g., a housecat sitting in front of a plotted plant). The anamorphic image data may be generated and the encoded anamorphic image may be rendered of a display surface (DS). The anamorphic image data may be generated based on properties of the DS, the source image, and properties of a reflective surface (e.g., mirrored cylinder object 130). The DS may be virtually any planar surface. For example, the DS may be a display device of a computing device, such as but not limited to display device 136 of tablet computing device 106. As shown in FIG. 1, anamorphic image 146 (depicting a distorted version of the scene of the house cat and plotted plant) is rendered by and on display device 136. In other embodiments, the DS may be paper, canvas, cardboard or the like, such as but not limited to paper sheet 138. As also shown in FIG. 1, anamorphic image 148 (also depicting the distorted version of the scene of the house cat and plotted plant) is rendered on paper sheet 138. Printer computing device 108, plotter computing device 110, or another such computing device may render anamorphic image 148 on paper sheet 138.

As shown in FIG. 1, when RS is positioned at a specified location on or near the DS, a reflected image of the anamorphic image is generated via a reflection of the anamorphic image from the RS. The reflected imaged visually depicts the scene (e.g., a housecat sitting in front of a plotted plant), via relatively undistorted and/or relative un-deformed, as compared to the anamorphic image rendered on the DS. For example, when RS 130 is positioned at a "center" of the anamorphic image 146, which is rendered on display device 136, the reflected image 156 is observable at a specified viewing angle. Similarly, when RS 130 is positioned at the center of anamorphic image 148, which is rendered on paper sheet 138, the reflected image 158 is observable at the specified viewing angle. Note that the reflected images 156/158 visually depict the scene with significantly less distortion than is depicted in the corresponding anamorphic images 146/148. That is, when reflecting the anamorphic images 146/148, the curvature of RS 130 "reverses" the distortion or deformation of the scene depicted in the anamorphic images 136/138, such that the scene visually depicted in the reflected images 156/158 more closely resembles the distortion-free visual depiction of the scene in the source image. Also note that the aspect ratio of the reflected images 146/148 is substantially equivalent to the aspect ratio of the source image.

Determining Rendering Parameters for Automatically Generating Anamorphic Images

Figure 2A:
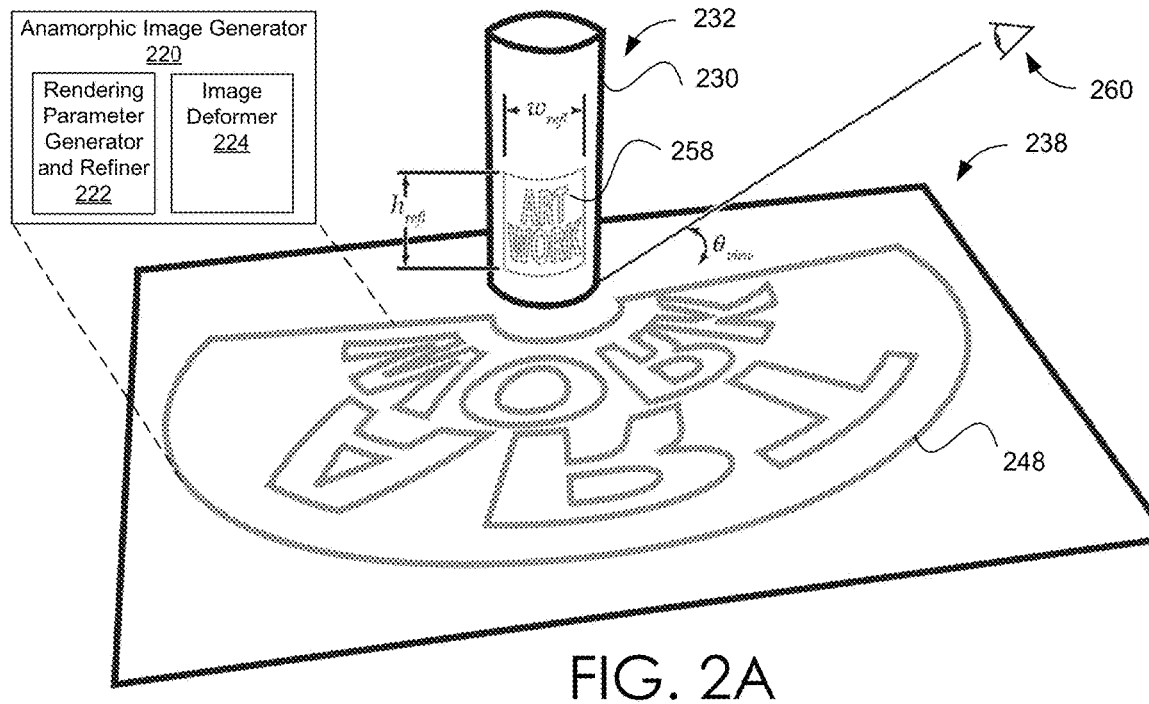
FIGS. 2A-2B schematically illustrate an anamorphic image and a relatively undistorted reflected image of the anamorphic image, in accordance with the various embodiments.
Figure 2B:
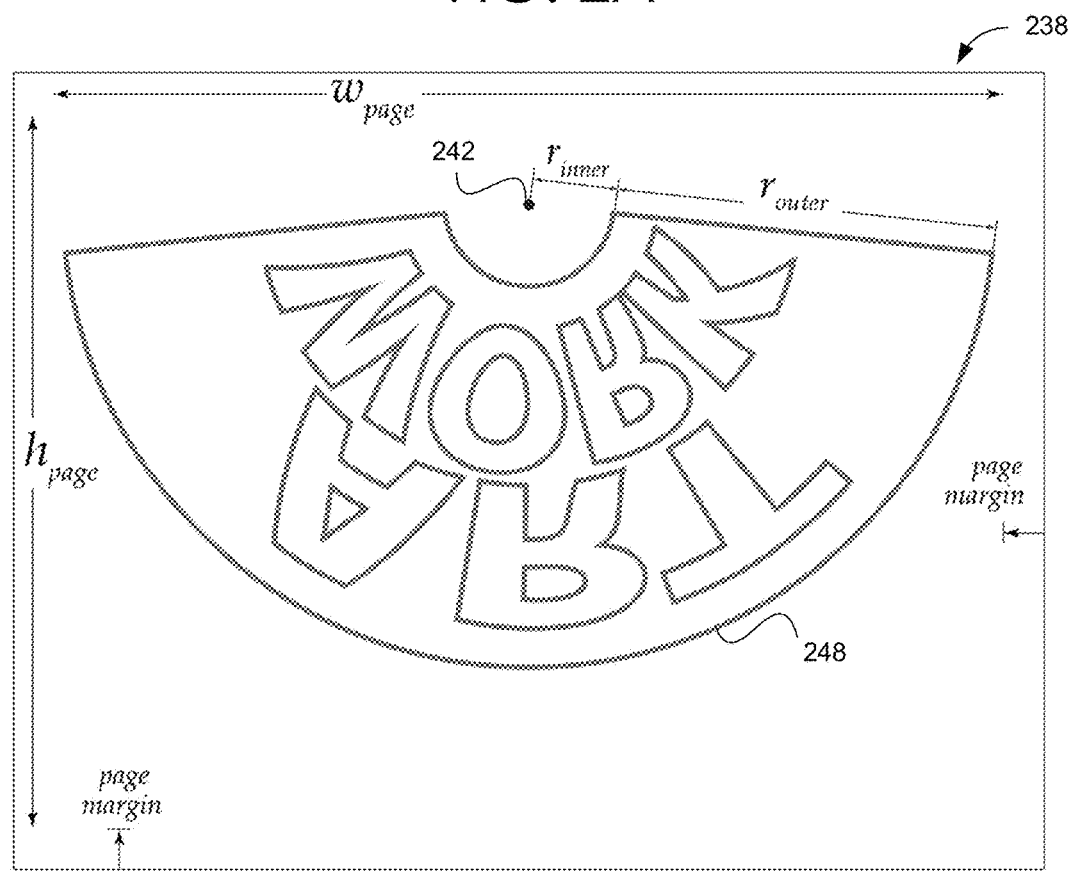

FIGS. 2A-2B schematically illustrate an anamorphic image and a relatively undistorted reflected image of the anamorphic image, in accordance with the various embodiments. The anamorphic image data is generated by anamorphic image generator 220, in accordance with the various embodiments. More specifically, FIGS. 2A-2B are provided to illustrate non-limiting examples of display surface (DS) properties, source image properties, reflective surface (RS) properties, and rendering parameters for the generation of anamorphic images that may be employed for embodiments that utilize cylindrical RS for catoptric anamorphosis (e.g., to automatically generate cylindrical anamorphic works of art). As discussed throughout, the embodiments are not limited to cylindrical-reflective geometries, and for these other embodiments, the properties and parameters discussed in the context of at least FIGS. 2A-2B may be modified, selected, and/or tailored for the specific geometry of the RS. In the following discussion, it is assumed that the RS is a reflective side of a cylinder or cylinder-like object. However, other embodiments are not so limited, and other reflective curved-geometries of the RS (e.g., spherical, conical, and the like) may be employed.

It is also assumed that source image data, encoding a source image, has been received by anamorphic image generate 220. Anamorphic image generator 220 is similar to anamorphic image generator 120 of FIG. 1. The received source image conforms to a polygonal footprint. In the embodiments shown in FIGS. 2A-2B, the polygonal footprint is a rectangular footprint. However, in other embodiments, the source image's footprint may be shaped as another type of polygon. The source image's rectangular footprint may be characterized by a source height ($h_{source}$) and a source width ($w_{source}$). For instance, the source height and the source width may characterize a rectangular area for rendering a copy of the source image. The source height and the source width may specify a unitless source aspect ratio. In some embodiments, because the source image may be considered as the source artwork the source height may be equivalently indicated as ($h_{art}$) and the source width may be equivalently indicated as ($w_{art}$).

As noted throughout, the source height and the source width may be specified via spatial units of measure (e.g., inches or meters) or number of image pixels (e.g., the resolution of the source image data). The indication via a spatial unit of measurement and the indication of the number of pixels may be converted back and forth via a conversion factor (e.g., number of pixels per inch). The shape of the polygonal footprint (e.g., a rectangular image footprint), the source height, the source width, and/or the unitless source aspect ratio may be encoded in values for a set of source image geometrical property parameters. The source image visually depicts an undistorted scene (e.g., the words "Art Work") and conforms to a rectangular footprint, characterized by the source image property parameters: source height, source width, and source aspect ratio. For example, see source image 400 of FIG. 4.

Referring to FIG. 2A, anamorphic image 248 is rendered on display surface (DS) 238. In various embodiments, anamorphic image 248 is encoded in anamorphic image data generated by anamorphic generator 220. As discussed throughout, the anamorphic image generator 220 may generate and apply an image transformation to the source image data to generate the anamorphic image data. The anamorphic image generator 220 may generate the image transformation based on the source image properties, DS properties, and RS properties discussed throughout. Anamorphic image generator 220 may include a rendering parameter generator and refiner 222 and an image deformer 224. In general, rendering parameter generator and refiner 222 is responsible for determining the set of rendering parameters. The set of rendering parameters defines the footprint and the location of the rendering area on the DS 238 based on various properties as discussed throughout. In some embodiments, the rendering parameter generator and refiner 222 is responsible refining and/or updating the rendering parameters under certain conditions (e.g., the anamorphic image 248 cannot be rendered on the DS 238). The image deformer 224 is generally responsible for generating an image transformation based on the set of rendering parameters and properties of the source image, as well as applying the image transformation to the source image data and generating the anamorphic image data.

Anamorphic image 248 visually depicts a distorted or deformed version of the scene depicted in the source image (e.g., the words "Art Work"). Also note the anamorphically deformed depiction of the scene in the anamorphic image 248 includes a mirror reflection (e.g., an "inside-out" reflection operation) of the scene depicted in the source image. In some embodiments, anamorphic image generator 220 generates the anamorphic image data by adding "distortion" or a "deformation" to the source image, as well as applying the "mirror-reflection" operation or transformation to the source image. A reflective object (i.e., cylinder 232) is positioned at a specified location (center 242 of anamorphic image 248, see FIG. 2B). Cylinder 232 includes a mirrored or reflective side surface, which is employed as a reflective surface (RS) 230. An image sensor (e.g., eye 260 of an observer) is positional at a viewing angle ($\theta_{view}$), where the viewing angle is measured as an elevation angle from the horizontal plane defined by the DS 238.

When viewed at the elevation angle, a reflected image 258 is observed via eye 260. The reflected image 258 is a reflection of the anamorphic image 248, and visually depicts the scene in the source image and the anamorphic image 248, but with significantly less distortion. Thus, the curvature of the RS 230 reverses the distortion of scene visually depicted in the anamorphic image 248. Also note the reflection from RS 230 reverses or "inverts," the mirror-reflection depiction of the scene in the anamorphic image 248. That is, the scene as appearing in both the source image and the reflected image 258 appear in substantially equivalent orientations. In contrast, the orientation of the distorted scene appearing the anamorphic image 248 is a "mirrored-reflected" orientation, where the scene as appearing in the source image and the reflected image 258 has been reflected by a mirror.

Like the source image, reflected image 258 conforms to a polygonal footprint (e.g., a rectangular footprint "wrapped around" the RS 130). As also similar to the source image, the rectangular footprint of the reflected image 258 is characterized by a reflected width ($w_{refl}$) and a reflected height ($h_{refl}$). The reflected width and the reflected height specify a reflected aspect ratio. Because of the "reverse-distorting" effects of the curvature of the RS 130, the reflected aspect ratio may be substantially equivalent to the source aspect ratio. That is, reflected image 258 may conform to a rectangular footprint that is substantially characterized by the source aspect ratio. The reflected height, the reflected width, and the reflected aspect ratio may be included in a set of reflected parameters.

Turning to FIG. 2B, FIG. 2B schematically illustrates a top-down view of DS 238, where the anamorphic image 248 has been rendered on DS 238. FIG. 2B is employed to illustrate some of the geometrical properties of DS 238, as well as some of the rendering parameters for anamorphic image 248. Due to the cylindrical geometry of RS 130, anamorphic image 248 conforms to a non-polygonal footprint that is in the shape of an annulus sector. That is, anamorphic image 248 is rendered within an area of the DS 238 that is shaped like a sector of an annulus. In embodiments where other curved reflective geometries (e.g., spherical, conical, or the like) are employed, the anamorphic image 248 may conform to other non-polygonal shapes and/or other non-polygonal footprints.

Various geometrical properties or features of the DS 238 may be indicated by values of various DS geometrical parameters. As noted throughout, the values of such geometrical parameters may be specified in units of linear dimensions or pixel units. In some embodiments, there is an area around the perimeter of the DS 238 that is not enabled to adequately render the anamorphic image 248. Such an area may be demarcated via a margin thickness around each edge of the DS 238, e.g., page margin ($m_{page}$). The area of the DS 238 that may adequately render anamorphic image 248 may be characterized by a page (or display) width ($w_{page}$) and a page (or display) height ($h_{page}$). Thus, a set of DS properties (or parameters) may include the page margin, the page (or display) width, and the page (or display) height.

The area of the DS 238 (that does not include the margins on the perimeter of the DS 238) that that the anamorphic image 248 is rendered in is characterized by a set of rendering parameters. For the embodiments where the footprint of the anamorphic image 238 is a sector of an annulus (or an entire annulus), the set of rendering parameters may include an inner radius ($r_{inner}$) and an outer radius ($r_{outer}$), as well as a center 242. Note that the inner radius of the rendering parameters indicates the radius of curvature of the "inner" curved segment of the annulus sector footprint. However, the radius of curvature of the "outer" curved segment of the annulus sector footprint is indicated by the sum of the inner radius and outer radius of the set of rendering parameters. In other words, the outer radius of the rendering parameters indicates the "thickness" of the annulus sector footprint. The length of the two line segments of the annulus sector footprint is substantially equivalent to the outer radius (or thickness of the annulus sector). Also note that the center 242 may be indicated by two Cartesian coordinates of the DS 238. In some embodiments, there may be margin between the RS 230 and the inner curved segment of annulus sector footprint of the anamorphic image 248, i.e., cylinder margin ($m_{cyl}$). The radius of curvature of the RS 230 may be referred to as the cylinder radius ($r_{cyl}$). To view the reflected image 258, the center of the base of the cylinder 232 may be positioned proximate the center 242 of the anamorphic image 248.

In some embodiments, a user may provide values for at least some of these properties or parameters, e.g., the viewing angle, the cylinder radius, the page margin, the cylinder margin, the page (or display) height, the page (or display) width, or any other such property or parameter. In some embodiments, at least some of the parameters are automatically determined. For example, the source height and source width may be automatically determined via the resolution or size of the source image data. In some embodiments, at least some of the DS properties may be automatically determined. The DS 238 may be a display device of a computing device or a sheet of paper that is employed by a printing or plotting computing device. In such embodiments, the page (or display) height and page (or display) width is automatically determined via querying the display device, printer device, or plotting device. In at least one embodiment, a user may provide the page margin, and the page (or display) height and the page (or display) width are automatically determined based on the page margin and a query that returns the physical dimensions of the display device and/or the sheet of paper. In still other embodiments, a user may manually provide the size of paper for the anamorphic image 248 to render on, and at least a portion of the DS properties may be determined via such user inputs.

The viewing angle approximates the elevation angle between the horizontal plane of the DS 238 and position of the image sensor 260 that perceives the reflected image 258. In various embodiments, the viewing angle may be set to a value of approximately $\pi/4$. A user may supply other values for the viewing angle. An appropriate choice of the viewing angle may enable the reflected image 158 to conform to a reflected aspect ratio similar to the source aspect ratio. In some embodiments, the cylinder radius may be determined via a measurement made with a touch-sensitive display device. For example, the base of cylinder 232 may be positioned on a horizontally-oriented touch-sensitive display device. A user may trace the circumference of the cylinder 232 with their finger. The radius of the cylinder may be determined via the data generated by the tracing. For example, DS 238 may be a touch-sensitive display of a mobile device. In another exemplary embodiment, a display device may display a plurality of circles, where the user may select the displayed circle that most closely matches the circumference of the cylinder. In some embodiments, the user may position the cylinder near the display device, such that the user may directly compare the circumference of the displayed circles to the circumference of the reflective cylinder, prior to selecting the most closely matching circle.

Figure 3:
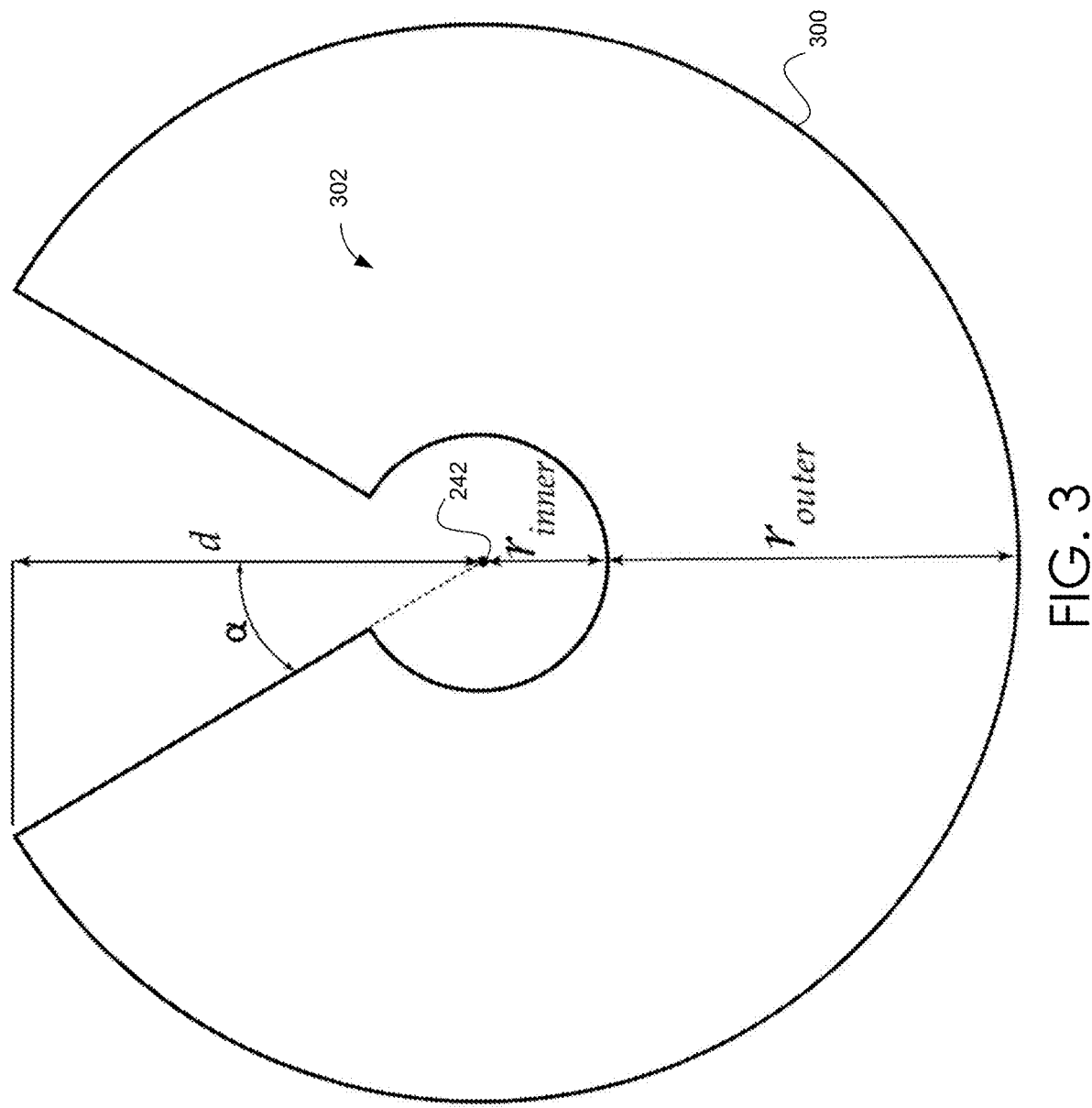
FIG. 3 schematically illustrates an annulus sector footprint that that forms the perimeter of an annulus-sector shaped rendering area for an anamorphic image, in accordance with the various embodiments.

Referring to FIG. 3, FIG. 3 schematically illustrates an annulus sector footprint 300 that that forms the perimeter of an annulus-sector shaped rendering area 302 for an anamorphic image, in accordance with the various embodiments. FIG. 3 is employed to illustrate additional rendering parameters for an anamorphic image. The rendering parameters may include at least one of sweep angle or a gap angle (a), where the sweep angle may be expressed in terms of the gap angle (or vice versa) via the expression: sweep=$2(\pi-\alpha)$. If sweep >$\pi$, then the rendering parameters may additionally include a depth parameter (d), which may be expressed in terms of the inner radius, the outer radius, and the gap angle via the following expression: d=$(r_{inner}+r_{outer})\times\cos(\alpha)$. If sweep ≤$\pi$, then d=0. FIG. 3 also shows the center 242 of the rendering area 303. The below table summarizes the notation for each of the parameters, constants, properties, and/or variables that may be employed throughout.

| Notation | Terminology | Description |
| --- | --- | --- |
| $w_{art}$ or $w_{source}$ | Source Width | Width (in pixels or linear distance) of the source image |
| $h_{art}$ or $h_{source}$ | Source Height | Height (in pixels or linear distance) of the source image |
| $w_{page}$ | Page Width | Width (in pixels or linear distance) of the portion of the display surface that the anamorphic image may be rendered upon |

-continued

| Notation | Terminology | Description |
|---|---|---|
| $h_{page}$ | Page Height | Height (in pixels or linear distance) of the portion of the display surface that the anamorphic image may be rendered upon |
| $r_{cyl}$ | Radius of Cylinder | Radius of curvature of the reflective cylinder |
| $\theta_{view}$ | Viewing Angle | Approximate elevation angle of the observer's eyes, as measured from the horizontal plane of the display surface |
| $m_{page}$ | Page Margin | The thickness (in pixels or linear distance) of the portion of the display surface around the perimeter of the display surface that may not be employed to render the anamorphic image |
| $m_{cyl}$ | Cylinder Margin | The distance (in pixels or linear distance) between the reflective surface of the cylinder and inner curved segment of the anamorphic image |
| $w_{refl}$ | Reflected Width | The width (in linear distance) of the reflected image on the reflective cylinder |
| $h_{refl}$ | Reflected Height | The height (in linear distance) of the reflected image on the reflective cylinder |
| $r_{inner}$ | Inner Radius | The radius of curvature of the inner curved segment of the bounds of the anamorphic image |
| $r_{outer}$ | Outer Radius | The absolute difference between the inner radius and the radius of curvature of the outer curved segment of the bounds of the anamorphic image |
| sweep | Sweep Angle | The sweeping or opening angle of the anamorphic image |
| $\alpha$ | Gap Angle | $2\pi$-sweep |

As noted above, rendering parameter generator and refiner 222 may determine rendering parameters (e.g., at least one of the inner radius, the outer radius, the center 242, the sweep angle, the gap angle, the depth parameter) based on the properties of the source image and the properties of the DS 238, and the properties of the RS 230, as well as the viewing angle and cylinder margin. Rendering parameter generator and refiner 222 may also determine the reflected parameters, e.g., the reflected height and the reflected width. In one non-limiting embodiment, the rendering and reflecting parameters are determined as follows:

$$r_{inner} = r_{cyl} + m_{cyl},$$

$$r_{outer} = \frac{w_{page}}{2} - r_{cyl},$$

$$h_{refl} = r_{outer} \times \tan(\theta_{view}),$$

$$w_{refl} = \left(\frac{w_{art}}{h_{art}}\right) \times h_{refl}, \text{ and}$$

$$\text{sweep} = \frac{w_{refl}}{r_{cyl}}.$$

Rendering parameter generator and refiner 222 may check whether the reflected image 258 overlaps itself on the cylinder. That is, parameter generator and refiner 222 may check whether $w_{refl} > 2\pi \times r_{cyl}$ and/or whether sweep $>2\pi$. Note that if sweep=$2\pi$, then then footprint 300 is an annulus shaped footprint and $\alpha=0$. If so, rendering parameter generator and refiner 222 may refine and/or update the rendering and reflected parameters as follows:

$$\text{sweep} = 2\pi$$

$$w_{refl} = 2\pi \times r_{cyl},$$

$$h_{refl} = \left(\frac{h_{art}}{w_{art}}\right) \times w_{refl}, \text{ and}$$

$$r_{outer} = \frac{h_{refl}}{\tan(\theta_{view})}.$$

If d>0 and/or if sweep $>\pi$, then rendering parameter generator and refiner 222 may also check whether the rendering area 302 will fit on the DS 238. For example, when $d+r_{inner}+d_{outer}>h_{page}$, rendering area 302 may not fit on DS 238. In such conditions, rendering parameter generator and refiner 222 may refine and/or update the rendering parameters and/or reflected parameters such that the rendering area 302 may fit on DS 238, as follows:

$$r_{outer} = \frac{(h_{page} - (r_{inner} + r_{inner} \times \cos(\alpha)))}{\cos(\alpha) + 1}$$

$$h_{refl} = r_{outer} \times \tan(\theta_{view}),$$

$$w_{refl} = \left(\frac{w_{art}}{h_{art}}\right) \times h_{refl}, \text{ and}$$

$$\text{sweep} = \frac{w_{refl}}{r_{cyl}}.$$

Within the plane of FIG. 2B, the x-component of the center 242 may be equidistant from the vertical edges of the DS 238, e.g., $$c_x = \frac{w_{page} + 2 \cdot m_{page}}{2},$$

where the origin is the upper left hand corner of DS 242. If sweep $<\pi$, then the y-component of the center 242 may be set to $c_y = -(m_{page}+r_{inner})$. Otherwise, to ensure that rendering area 302 fits on DS 238, the y-component of the center may be determined as follows:

$$c_y = \left(m_{page} + \frac{h_{page}}{2} - ((r_{inner} + r_{outer}) - \cos(\alpha) \times (r_{inner} + r_{outer}))\right)/2.$$

Transforming the Source Image into an Anamorphic Image

After the rendering parameter generator and refiner 222 has determined and refined the rendering and reflected parameters, the image deformer 224 of anamorphic image generator 220 may generate an image transformation based on the rendering parameters and the reflected parameters. The image transformation may be a non-affine projection of the source image onto a non-polygonal rendering area (e.g., annulus sector rendering area 302) bounded by a non-polygonal image footprint (e.g., annulus sector footprint 300). The image deformer 224 may then apply the image transformation to the source image data to generate anamorphic image data, which encodes the anamorphic image.

The image transformation may be a non-affine image transformation that maps the source image to an anamorphic image via a continuous or a non-continuous deformation (e.g., a homeomorphism of the source image into the anamorphic image). As noted throughout, the source image may conform to a polygonal footprint (e.g., a rectangular shaped footprint), and via the application of the image transformation, the anamorphic image may conform to a non-polygonal (e.g., an annulus sector footprint). In various embodiments, the image transformation may employ parametric patch deformations. Various embodiments of image transformations that employ parametric patch deformations are described in U.S. patent application Ser. No. 16/141,226, entitled "GENERATING ENHANCED DIGITAL CONTENT USING PIECEWISE PARAMETRIC PATCH DEFORMATIONS," filed on Sep. 25, 2018, the contents of which are incorporated herein in entirety. Any of the various embodiments of image transformations described in the above noted patent application may be employed to deform a source image into an anamorphic image. For example, the image transformation may employ multiple Bézier patch transformations, as described in the above noted patent application. Other embodiments are not so limited and other types of image transformation may be employed. For example, in embodiments that employ a cylindrical reflective geometry, where the rendering area for the anamorphic image is shaped as an annulus sector, polar mapping may be employed to map the source image, conforming to a rectangular footprint, to the anamorphic image, conforming to the annulus sector footprint.

Figure 4:
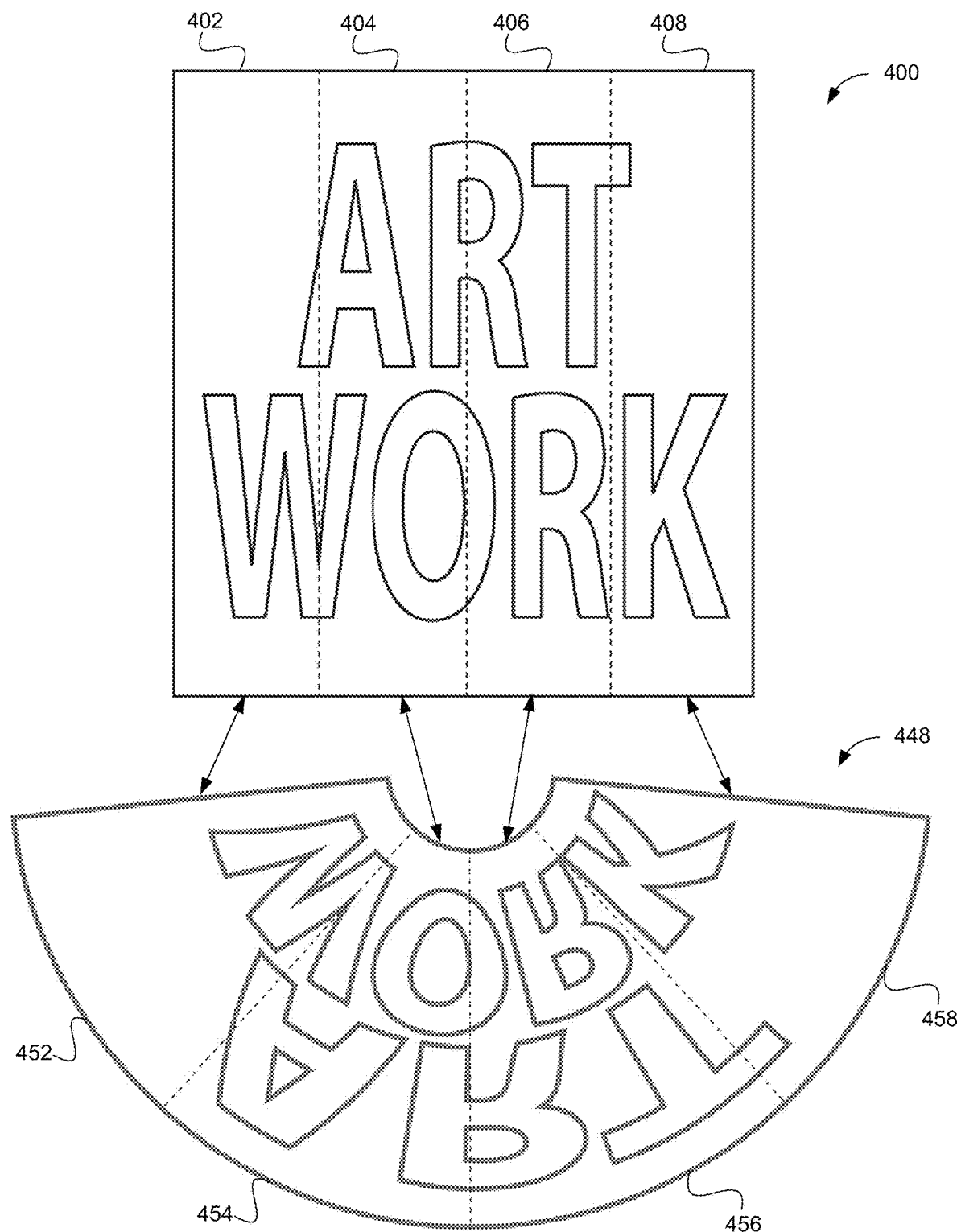
FIG. 4 illustrates a parametric patch transformation applied to a Cartesian source image to generate a cylindrically mapped anamorphic image, in accordance with the various embodiments.

Turing to FIG. 4, FIG. 4 illustrates a parametric (e.g., a Bézier) patch transformation applied to a Euclidean source image 400 to generate a Non-Euclidean anamorphic image 448, in accordance with the various embodiments. In such embodiments, the source image data may be subdivided into a plurality of the disjoint subsets of the source image data. Each of the plurality of disjoint subsets of the source image data encodes a separate portion of the source image such that the source image is subdivided into a plurality of disjoint polygonal patches. For example, for Bezier patch embodiments, the source image 400 is divided into four separate rectangular patches: first source patch 402, second source patch 404, third source patch 406, and fourth source patch 408. Note that the source patches 402-408 are rectangular patches. A first subset of the source image data encodes the first source patch 402 of the source image 400. Also note that first source patch 402 conforms to a first bi-cubic (e.g., rectangular) sub-footprint of the rectangular footprint of the source image 400. Similarly, a second subset of the source image data encodes the second source patch 404 of the source image 400, a third subset of the source image data encodes the third source patch 406 of the source image 400, and a fourth subset of the source image data encodes the fourth source patch 408 of the source image 400.

The rendering area of anamorphic image 4448 may be subdivided into a plurality of patches. There may be a one-to-one mapping between each of the plurality of patches of the source image 400 and each of the plurality of patches of the anamorphic image 448. As shown in FIG. 4, the anamorphic image 448 is subdivided into four annulus sector patches with a one-to-one correspondence to the four rectangular patches of the source image 400. As shown via the correspondence arrows in FIG. 4, a first anamorphic patch 452 of the anamorphic image 450 corresponds to the first source patch 402 of the source image 400, a second anamorphic patch 454 of the anamorphic image 450 corresponds to the second source patch 404 of the source image 400, a third anamorphic patch 456 of the anamorphic image 450 corresponds to the third source patch 406 of the source image 400, and a fourth anamorphic patch 458 of the anamorphic image 450 corresponds to the fourth source patch 408 of the source image 400. Note that each of the anamorphic patches 452-458 conform to annulus sector sub-footprints of the annulus sector footprint of the anamorphic image 448.

In various embodiments, for each of the plurality of sets of source image data, a deforming transformation is generated. The deforming transformation may be parametric non-affine transformations. The deforming transformations are applied to each of the corresponding sets of source image data to generate the corresponding subset of anamorphic image data. For instance, via an application of a first deforming transformation to the first subset of source image data (encoding first source patch 402), a corresponding first subset of anamorphic image data is generated encoding the first anamorphic patch 452 of the anamorphic image 448. Note that in addition to deforming the source image, each of the deforming transformations provides a mirrored reflection of the corresponding source patch.

To generate such as parametric deforming transformation, a unit curved segment may be generated for each of non-polygonal anamorphic patches 452-458. The curved segment may be a unit circle segment. The curved segment may be parameterized via one or more control points, see generally FIG. 5A. Via a plurality of translating, scaling, and rotating operations, the unit curved segment may be employed to generate a plurality of patch control points (e.g., Bezier patch control points), see generally FIG. 5B. The control points are employed to generate a mesh on the rendering area of the anamorphic image 448. See generally FIG. 6, where the mesh is a polar coordinate mesh. The image transformations are generated based on the mesh and the control points. The unit circular segment 500 (with opening angle a) is parameterized by four (Bezier) control points: $P_0$, $P_1$, $P_2$, and $P_3$, which are determined via the opening angle (a) as follows (in Cartesian coordinates for the coordinate system shown in FIG. 5A). Note that because there are four annulus sector patches, that a=sweep/4, such that $0 < a \leq \pi/2$, and the computed quantity y is employed to determine the control points:

$$y = \frac{(4 - \cos(a))}{3},$$

$$P_3 = [\sin(a), \cos(a)],$$

$$P_2 = \left[ \frac{(1 - y \cdot \cos(a))}{\sin(a)}, y \right],$$

$$P_1 = [-P_{2x}, y], \text{ and}$$

$$P_0 = [-P_{3x}, P_3 y].$$

Figure 5A:
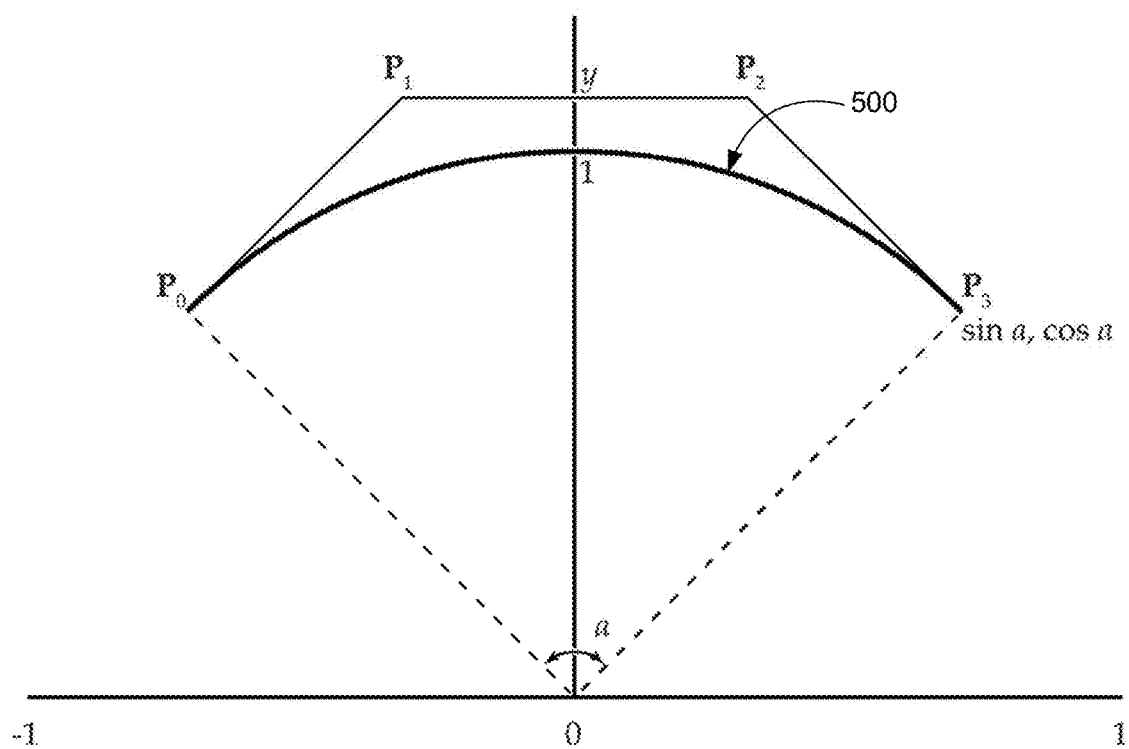
FIG. 5A graphically illustrates a construction of the cubic Bézier representation of a unit circular segment and corresponding control points, in accordance with the various embodiments.
Figure 5B:
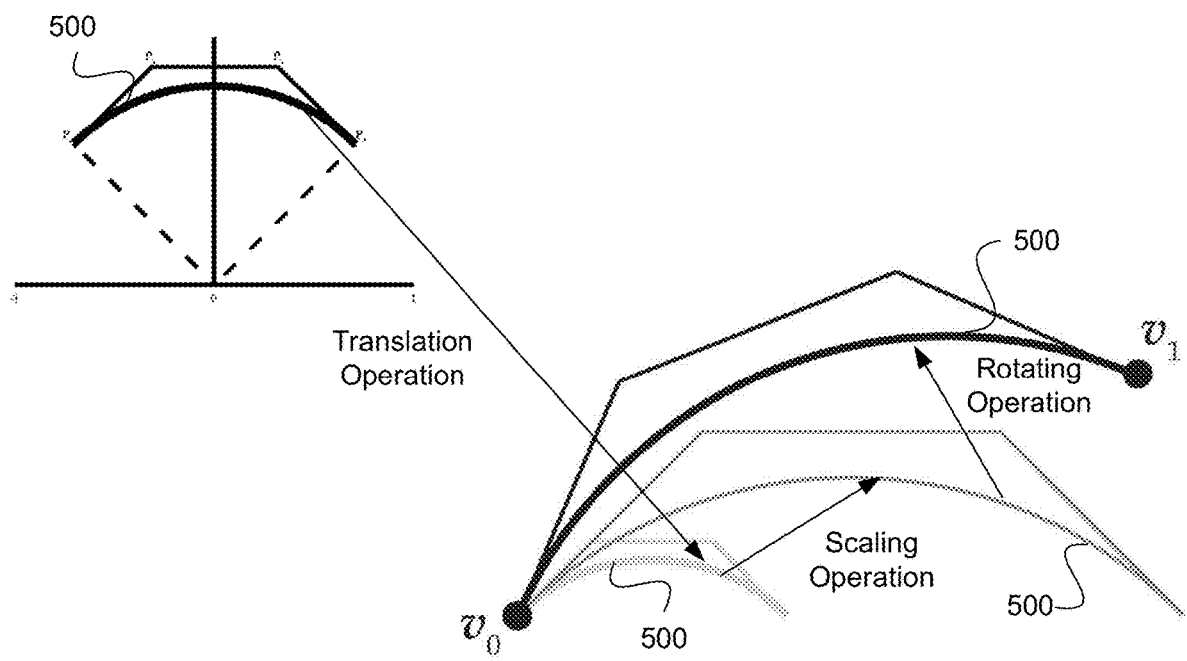
FIG. 5B graphically illustrates the translating, scaling, and rotating operations on the unit circular segment of FIG. 5A to generate the transformed curve control points that are employed to generate a mesh on a rendering area of the anamorphic image, in accordance with the various embodiments.
Figure 6:
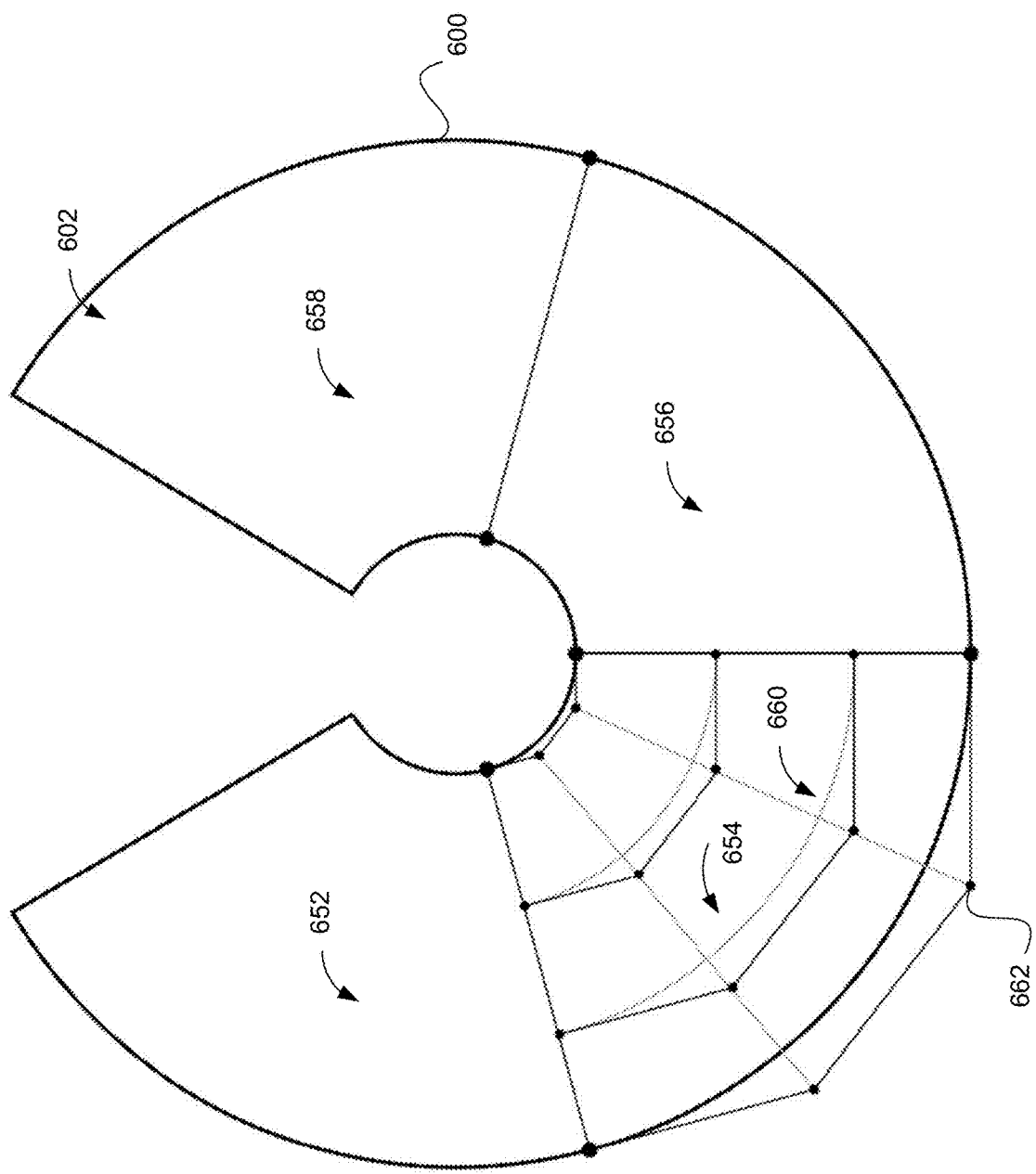
FIG. 6 graphically illustrates a mesh imposed on non-polygonal patches of a rendering area for an anamorphic image, in accordance with the various embodiments.

To generate the mesh on each of the non-polygonal patches of the rendering area of the anamorphic image 438, the unit circular segment 500 must be repeatedly transformed to generate the circular segments of the mesh (see FIG. 6). To transform the unit circular segment 500 (centered at [0,0] with unit radius as shown in FIG. 5A, such that segment endpoints $P_0$ and $P_3$ are transformed to corresponding arbitrary points $v_0$ and $v_1$, $P_0 \rightarrow v_0$ and $P_3 \rightarrow v_1$ the following transformations are employed:

$$h = \|v_0 - v_1\|,$$
$$r = \frac{h}{\cos(\pi/2) - a}, \text{ and}$$
$$C = [v_{0x} + h, v_{0y} + \sqrt{r^2 + h^2}],$$

where r and C are respectively the transformed radius and center of transformed unit circular segment. The control points may be transformed via: $P_i \rightarrow P_i + C$, for i=0,1,2,3. The unit circular segment 500 may then be rotated about $P_0$ by an angle formed by the x-axis and the line segment joining $v_0$ and $v_1$. These transformations have the effect of translating, scaling, and rotating the unit circular segment 500. FIG. 5B graphically illustrates the translating, scaling, and rotating operations on the unit circular segment 500 to generate the transformed patch control points that are employed to generate the mesh on the rendering area of the anamorphic image 438.

FIG. 6 graphically illustrates the polar mesh imposed on the non-polygonal patches of the rendering area for an anamorphic image, in accordance with the various embodiments. Similarly, to FIG. 3, FIG. 6 shows rendering area 602 bound by annulus sector footprint 600. FIG. 6 also shows the four annulus sector patches of the rendering area 602: first anamorphic patch 652, second anamorphic patch 654, third anamorphic patch 656, and fourth anamorphic patch 658. The polar mesh 660 is shown imposed on second anamorphic patch 654. To generate the parametric image transformation (e.g., the Bezier patch transformation), the polar mesh 660 will be similar imposed on the other anamorphic patches. Note the plurality of control points (Bezier control point 602) that parameterize the polar mesh 660. The polar angles for each of the anamorphic patches are determined as:

$$\left[-\frac{\text{sweep}}{2}, -\frac{\text{sweep}}{4}, 0, \frac{\text{sweep}}{4}, \text{sweep}/2\right].$$

As described in U.S. patent application Ser. No. 16/141,226 (incorporated above), mesh 660 and the plurality of parametric control points may be employed to generate the Bezier patch image transformation and apply the transformations to the source image data to generate the encoding anamorphic image data.

Generalized Processes for Generating Anamorphic Images

Figure 7A:
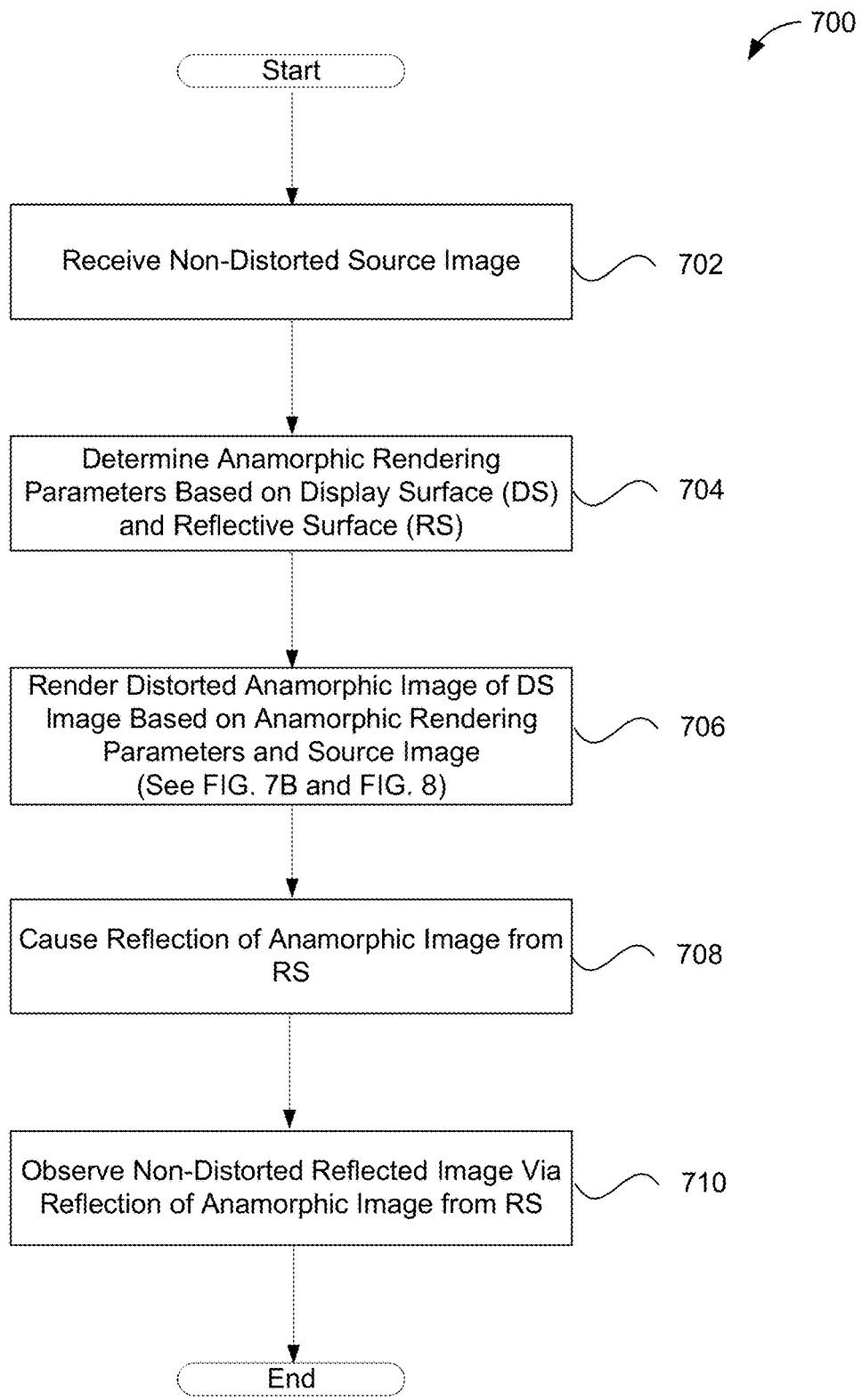
FIG. 7A illustrates one embodiment of an enhanced process for generating anamorphic images, which is consistent with the various embodiments presented herein.
Figure 7B:
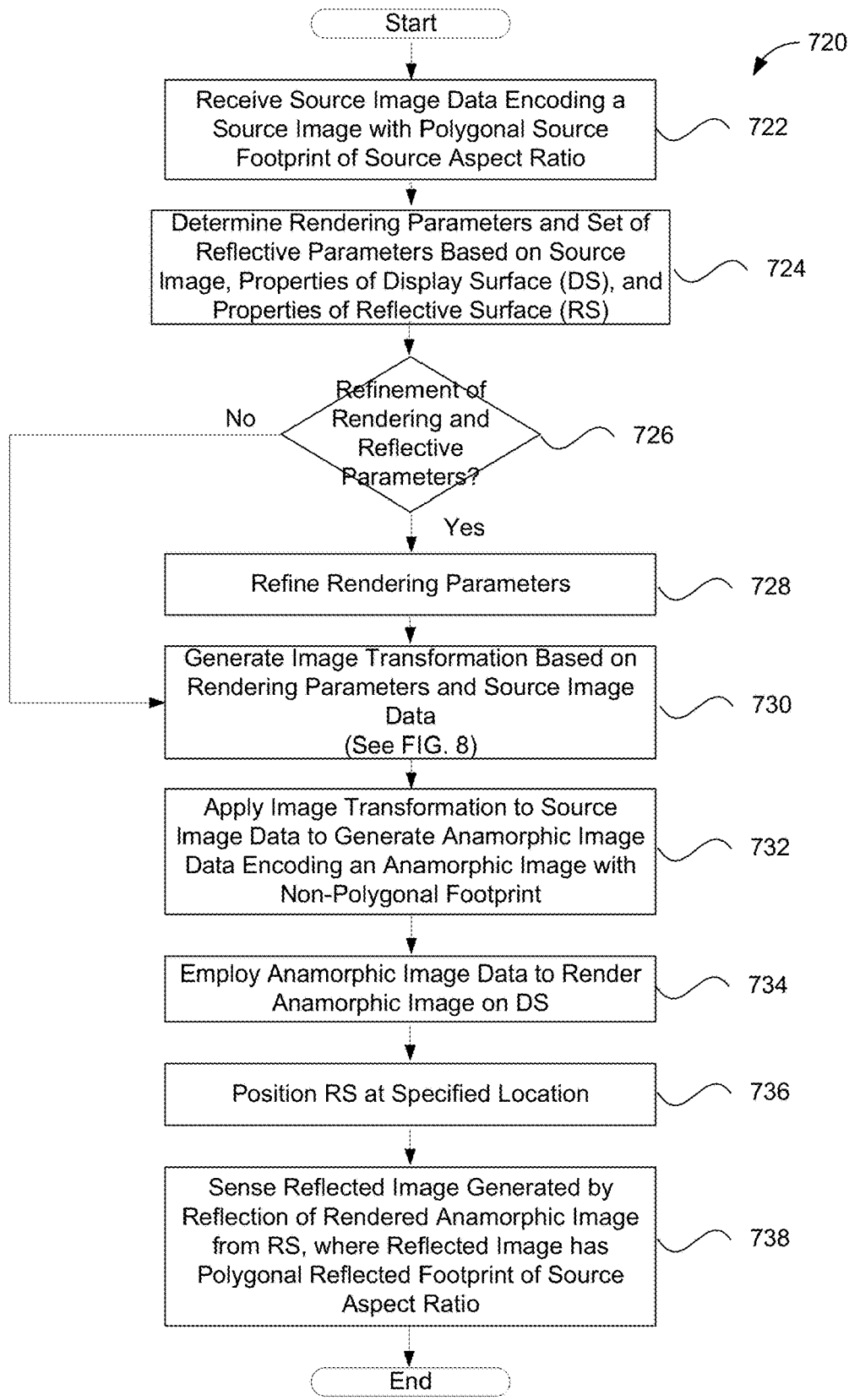
FIG. 7B illustrates another embodiment of an enhanced process for generating anamorphic images, which is consistent with the various embodiments presented herein
Figure 8:
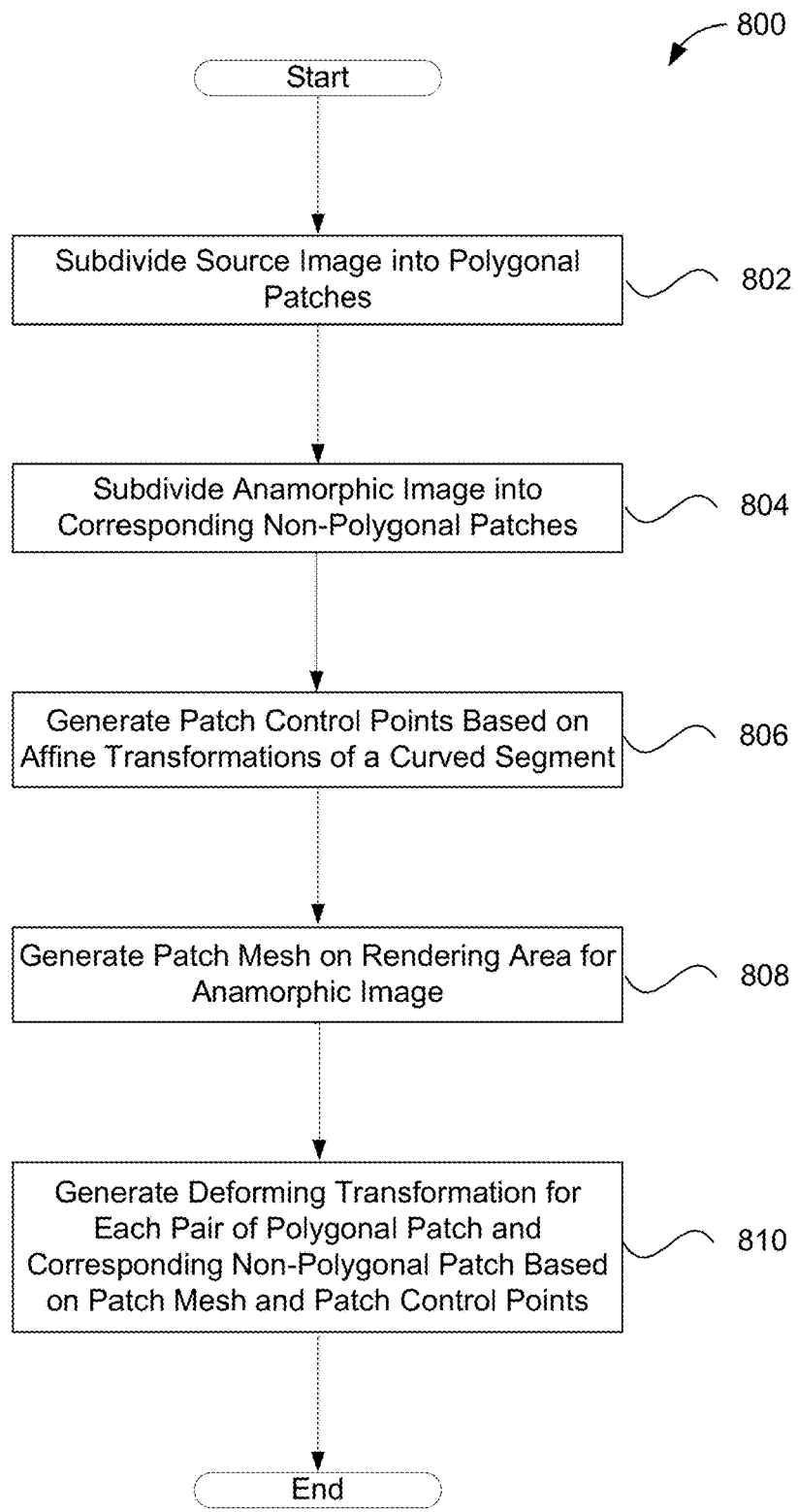
FIG. 8 illustrates one embodiment of an enhanced process for generating image transformations, which is consistent with the various embodiments presented herein.
Figure 9:
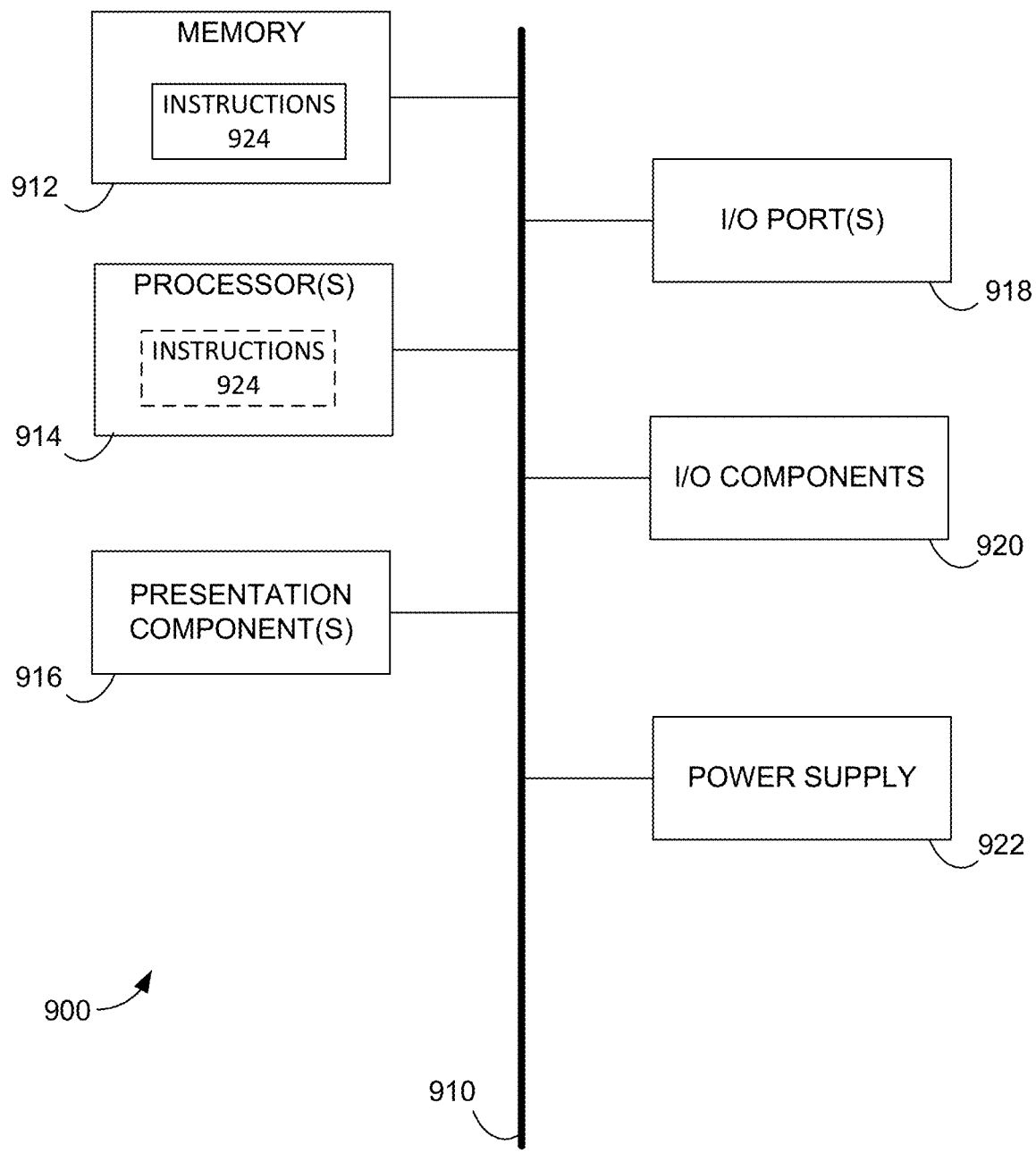
FIG. 9 is a block diagram of an example computing device in which embodiments of the present disclosure may be employed.

Processes 700, 720, and 800 of FIG. 7A, FIG. 7B, and FIG. 8 respectively, or portions thereof, may be performed and/or executed by any computing device, such as but not limited to computing devices 102-110 of FIG. 1, as well as computing device 900 of FIG. 9. Additionally, an anamorphic image generator, such as but not limited to anamorphic image generator 120 of FIG. 1 and/or anamorphic image generator 220 of FIG. 2A, may perform and/or execute at least portions of process 700, process 720, and/or process 800.

FIG. 7A illustrates one embodiment of an enhanced process for generating anamorphic images, which is consistent with the various embodiments presented herein. Process 700 begins, after a start block, at block 702, where a non-distorted image is received. The non-distorted source image may be received via source image data that encodes the source image. The source image may have a polygonal (e.g., rectangular) boundary, such as a rectangular bounding box. The rectangular source boundary have a source aspect ratio.

At block 704, anamorphic rendering parameters may be determined based on a display surface (DS) and a reflective surface (RS). In some embodiments, the DS may be a first surface and the RS may be a second surface. The anamorphic rendering parameters may include a set of rendering parameters for rendering an anamorphic (e.g., distorted) image that is a distortion of the source image. The set of rendering parameters may characterize a non-rectangular boundary for a rendering area of the DS. The set of rendering parameters may also characterize a rectangular reflected boundary for a reflected image. The rectangular reflected boundary may have an aspect ratio that is equivalent, or at least similar, to the source aspect ratio. The set of rendering parameters may be determined via any of the embodiments discussed herein, such as but not limited to the embodiments discussed in conjunction with blocks 724, 726, and 728 of FIG. 7B.

At block 706, the anamorphic (e.g., distorted) image is rendered in the rendering area of the DS. Various embodiments of rendering an anamorphic image are discussed in conjunction with at least FIG. 7B and FIG. 8. The anamorphic image may be rendered based on the set of anamorphic and/or rendering parameters. Briefly, an image transformation may be determined based on the anamorphic parameters. The image transformation may be a deforming image transformation such as but not limited to a Bezier patch-based deformation transformation and/or a polar mapping-based deformation transformation. The image transformation and the source image data may be employed to generate anamorphic image data that encodes the anamorphic image. That is, the image transformation may be applied to the source image data. As noted throughout, the anamorphic image may have the anamorphic boundary. The anamorphic boundary may be an annulus or an annulus sector. The anamorphic image data may be employed to render the anamorphic image in the rendering area of the DS. The anamorphic image may be a distorted version of the source image.

At block 708, a reflection of the anamorphic image from the RS may be caused. For example, a user may position the RS at a specified location, such that the rendered anamorphic image is projected onto the RS and is reflected from the RS. At block 710, a non-distorted reflected image may be observed (at one or more viewing angles) via the reflection of the anamorphic image from the RS. The reflected image may have the reflected boundary that is characterized via the set of rendering or anamorphic parameters. The reflected boundary may be a rectangular (or square) bounding box that has an aspect ratio that is equivalent, or at least similar, to the source aspect ratio of the source image. The reflected image may be a version of the source image, but with significantly less distortion than the anamorphic image.

FIG. 7B illustrates another embodiment of an enhanced process for generating anamorphic images, which is consistent with the various embodiments presented herein. Process 720 begins, after a start block, at block 722, where a source image data encoding a source image is received. The source image may conform to a polygonal footprint of a source aspect ratio. The source footprint may be a rectangular footprint. The source image may include properties such as a source height and a source width that characterized the rectangular footprint. Process 720 may employ the source image data may be to generate anamorphic image data encoding an anamorphic image.

At block 724, a set of rendering parameters for the anamorphic image may be determined. Furthermore, a set of reflected parameters may be determined at block 724. The reflected parameters may characterize the reflected image. The rendering parameters and the reflected parameters may be based on geometrical properties or parameters of a display surface (DS) that is employed to render the anamorphic image, source image properties, and/or properties of a reflective surface (RS) that is employed to reflect the anamorphic image and generate the reflected image.

The set of rendering parameters may characterize a rendering area of the DS that is bound by a non-polygonal perimeter. The non-polygonal perimeter may be characteristic of an anamorphic footprint. The RS may be a reflective side surface of a cylindrical object. In at least one embodiment, the radius of curvature of the RS may be determined by positioning the RS on a touch-sensitive display device and a tracing of a circumference of the RS on the touch-sensitive display device. The anamorphic footprint (or non-polygonal footprint) may be an annular sector footprint. The DS properties may include a page margin, a page (or display) width, a page (or display) height, a cylinder margin, a viewing angle, and the like. The rendering parameters may include an inner radius, an outer radius, a sweep angle, a center, and the like.

More specifically, the inner radius of the set of rendering parameters may be determined based on a radius of curvature of the RS. The outer radius of the set of rendering parameters may be determined based on the radius of curvature of the RS and a display width of the set of DS properties. The reflected image height of the reflected image may be determined based on the outer radius and the viewing angle. The reflected image width of the reflected image may be determined based on the reflected image height and the source aspect ratio. A reflected aspect ratio of the reflected image may be substantially equivalent to the source aspect ratio of the source image. The sweep angle of the set of rendering parameters may be determined based on the reflected image width and the radius of curvature of the RS.

At decision block 726, it is determined whether the rendering and/or reflected parameters requirement refinement and/or updating. For example, it may be determined at block 726 that the reflected image height is greater than a circumference of the RS. If so, the rendering parameters and/or the reflected parameters may be refined and/or updated. Furthermore, it may be determined that the rendering height of the rendering area is greater than the display height of the set of DS properties. If so, the rendering parameters and/or the reflected parameters may be refined and/or updated. If the rendering and/or reflected parameters are to be refined, then process 720 may flow to block 728. Otherwise, process 720 may flow to block 730.

At block 728, and in response to determining that the reflected image width is greater than the circumference of the RS, the reflected image width may be updated to be substantially equivalent to the circumference of the RS. In such embodiments, the reflected image height may be updated based on the updated reflected image width and the source aspect ratio. An updated reflected aspect ratio of the reflected image may be substantially equivalent to the source aspect ratio of the source image. The outer radius of the set of rendering parameters may be updated based on the updated reflected image height and the viewing angle. The sweep angle of the set of rendering parameters may be updated based on the updated reflected image width and the radius of curvature of the RS.

Also at block 728, and in response to determining that the rendering height of the rendering area is greater than a display height of the set of DS properties, the outer radius may be updated based on the display height, the inner radius, and the sweep angle. The reflected image height may be updated based on the updated outer radius and the viewing angle. The reflected image width may be updated based on the updated reflected image height and the source aspect ratio such. An updated reflected aspect ratio of the reflected image may be substantially equivalent to the source aspect ratio of the source image. The sweep angle may be updated based on the updated reflected image width and the radius of curvature of the RS surface.

At block 730, one or more image transformations are generated based on the rendering parameters and the source image data. Various embodiments for generating image transformations are discussed in conjunction with at least process 800 of FIG. 8. However, briefly here, the image transformations may be a non-affine image transformations that map the source image to the anamorphic image via a continuous or non-continuous deformation (e.g., a homeomorphism of the source image into the anamorphic image. In various embodiments, the image transformation may employ parametric patch deformations. For example, the image transformation may employ multiple Bezier patch transformations. Other embodiments are not so limited and other types of image transformation may be employed. For example, in embodiments that employ a cylindrical reflective geometry, where the rendering area for the anamorphic image is shaped as an annulus sector, polar mapping may be employed to map the source image, conforming to a rectangular footprint, to the anamorphic image, conforming to the annulus sector footprint.

At block 732, the one or more image transformations are applied to the source image data to generate the anamorphic image data encoding the anamorphic image that conforms to the non-polygonal anamorphic footprint. The non-polygonal anamorphic footprint may be substantially equivalent to the non-polygonal rendering area. As discussed throughout, the anamorphic footprint may be an annular sector (or annulus) footprint.

At block 734, the anamorphic image data may be employed to render the anamorphic image data on the DS. The anamorphic image may be rendered such that the non-polygonal perimeter of the rendering area of the DS bounds the rendered anamorphic image. The anamorphic image may be rendered such that when the RS is positioned proximate a specified location, the RS reflects the anamorphic image such that a reflected image of the scene is received at the viewing angle. The reflected image may conform to a polygonal (e.g., rectangular) reflected footprint that is characterized by the source aspect ratio.

As discussed throughout, the DS may be a display device of a mobile computing device. Rendering the anamorphic image may include includes displaying the anamorphic image on the display device of the mobile computing device. The specified location may be a location on the display device of the mobile computing device. In other embodiments, rendering the anamorphic image includes employing a printing computing device to prints the anamorphic image. In still other embodiments, rendering the anamorphic image includes employing a plotter computing device to plot the anamorphic image.

At block 736, the RS may be positioned at the specified location. At block 736, the reflected image may be sensed and/or observed. As noted throughout, the reflected image may be generated by a reflection of the anamorphic image from the RS. The reflected image may conform to a polygonal footprint that is characterized by the source aspect ratio.

FIG. 8 illustrates one embodiment of an enhanced process for generating image transformations, which is consistent with the various embodiments presented herein. Process 800 begins, after a start block, at block 802, where the source image is subdivided into polygonal patches. More particularly, the source image data may be subdivided into a plurality of the disjoint subsets of the source image data. Each of the plurality of disjoint subsets of the source image data may encodes a separate portion of the source image such that the source image is subdivided into a plurality of disjoint polygonal patches. A first subset of the source image data may encode a first polygonal patch of the source image. The first polygonal patch may conform to a first polygonal sub-footprint of the source footprint.

At block 804, the anamorphic image may be subdivided in non-polygonal patches corresponding to the polygonal patches of the source image. More particularly, a rendering area associated with the anamorphic image (e.g., a rendering area on the DS) into a plurality of disjoint non-polygonal patches. There may be a one-to-one mapping (or correspondence) between each of the plurality of polygonal patches and each of the plurality of non-polygonal patches. For example, a first non-polygonal patch of the rendering area may correspond to the first polygonal patch of the source image. The first non-polygonal patch of the rendering area may conform to a first non-polygonal sub-footprint of the anamorphic footprint.

At block 806, patch control points (e.g., Bézier patch control points) may be generated based on affined transformations of a curved segment. More particularly, a unit curved segment (e.g., a circular segment with a unit radius and opening angle substantially equivalent to sweep/4) may be generated. A plurality of affine operations (e.g., translating, scaling, and rotating operations) may be performed on the unit curved segment to generate a plurality of patch control points.

At block 808, a patch mesh may be generated on the rendering area of the anamorphic image. That is, a mesh of the rendering area may be generated that is parameterized by the plurality of control points. At block 810, a deforming transformation may be generated for each pair of polygonal patch and corresponding non-polygonal patch may be generated. The deforming transformations may be generated base on the patch mesh and the patch control points.

Illustrative Computing Device

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon for rendering images on a first surface, which, when executed by a processor device, cause performance of actions comprising:
    receiving source image data encoding a source image having a source boundary;
    determining a set of rendering parameters based on the source boundary, the first surface, and a second surface, the set of rendering parameters characterizing an anamorphic boundary for a rendering area of the first surface;
    employing the source image data and an image transformation based on the set of rendering parameters to generate anamorphic image data encoding an anamorphic image having the anamorphic boundary; and
    employing the anamorphic image data to cause rendering of the anamorphic image within the rendering area of the first surface.

2. The computer-readable storage medium of claim 1, wherein the second surface is a reflective side surface of a cylindrical object, the source boundary is a first rectangular bounding box, the anamorphic boundary is an annulus sector boundary, and set of rendering parameters further characterize a rectangular reflected boundary that is a second rectangular bounding box.

3. The computer-readable storage medium of claim 1, wherein the method further comprises generating the image transformation and generating the image transformation includes:
    subdividing the source image data into a plurality of the disjoint subsets of the source image data, wherein each of the plurality of disjoint subsets of the source image data encodes a separate portion of the source image such that the source image is subdivided into a plurality of disjoint rectangular patches, and wherein a first subset of the source image data encodes a first rectangular patch of the source image that has a first rectangular sub-boundary of the source boundary;
    subdividing the rendering area into a plurality of disjoint anamorphic patches such that there is a one-to-one mapping between each of the plurality of rectangular patches and each of the plurality of anamorphic patches, wherein a first anamorphic patch of the rendering area corresponds to the first rectangular patch of the source image and conforms to a first anamorphic sub-boundary of the anamorphic boundary; and
    for each of the plurality of sets of source image data, generating a deforming transformation, wherein via an application of a first deforming transformation to the first subset of source image data, a corresponding first subset of anamorphic image data is generated encoding a first anamorphic patch of the anamorphic image that corresponds to the first rectangular patch of the source image and conforms to the first anamorphic sub-boundary of the anamorphic boundary.

4. The computer-readable storage medium of claim 3, wherein the first anamorphic patch of the anamorphic image is a non-affine deformation of the first rectangular patch of the source image and the application of the first deforming transformation to the first subset of source image performs the non-affine deformation of the first rectangular patch of the source image.

5. The one or more computer-readable storage media of claim 1, wherein the method further comprises generating the image transformation and generating the image transformation includes:
   generating a unit curved segment;
   performing a plurality of translating, scaling, and rotating operations on the unit curved segment to generate a plurality of Bezier patch control points;
   generating a mesh of the rendering area of the first surface that is parameterized by the plurality of Bezier control points; and
   generating the image transformation based on the mesh of the rendering area and the plurality of Bezier control points.

6. The one or more computer-readable storage media of claim 1, wherein the source boundary has a source aspect ratio, and when the second surface is positioned proximate to a specified location, a reflected image is generated, via a reflection of the anamorphic image from the second surface, the reflected image having the reflected boundary that has the source aspect ratio, and wherein the actions further comprise:
   determining an inner radius of the set of rendering parameters based on a radius of curvature of the second surface;
   determining an outer radius of the set of rendering parameters based on the radius of curvature of the second surface and a display width of the set of first surface properties;
   determining a reflected image height of the reflected image based on the outer radius and a viewing angle;
   determining a reflected image width of the reflected image based on the reflected image height and the source aspect ratio such that a reflected aspect ratio of the reflected image is substantially equivalent to the source aspect ratio of the source image; and
   determining a sweep angle of the set of rendering parameters based on the reflected image width and the radius of curvature of the RS.

7. The one or more computer-readable storage media of claim 6, wherein the actions further comprise:
   in response to determining that the reflected image width is greater than a circumference of the second surface, updating the reflected image width to be substantially equivalent to the circumference of the second surface;
   updating the reflected image height based on the updated reflected image width and the source aspect ratio such that an updated reflected aspect ratio of the reflected image is substantially equivalent to the source aspect ratio of the source image;
   updating the outer radius of the set of rendering parameters based on the updated reflected image height and the viewing angle; and
   updating the sweep angle of the set of rendering parameters based on the updated reflected image width and the radius of curvature of the second surface.

8. The one or more computer-readable storage media of claim 6, wherein the actions further comprise:
   in response to determining that the rendering height of the rendering area is greater than a display height of the set of first surface properties, updating the outer radius based on the display height, the inner radius, and the sweep angle;
   updating the reflected image height based on the updated outer radius and the viewing angle;
   updating the reflected image width based on the updated reflected image height and the source aspect ratio such that a reflected aspect ratio of the reflected image is substantially equivalent to the source aspect ratio of the source image; and
   updating the sweep angle based on the updated reflected image width and the radius of curvature of the second surface.

9. The one or more computer-readable storage media of claim 1, wherein the image transformation is based on a Bezier patch deformation.

10. The one or more computer-readable storage media of claim 1, wherein the image transformation is based on a polar mapping deformation.

11. The one or more computer-readable storage media of claim 1, wherein a radius of curvature of the second surface is determined via a positioning of the surface on a touch-sensitive display device and a tracing of a circumference of the second surface on the touch-sensitive display device.

12. The one or more computer-readable storage media of claim 1, wherein the first surface is a display device of a mobile computing device, rendering of the anamorphic image includes displaying the anamorphic image on the display device of the mobile computing device, and the specified location is a location on the display device of the mobile computing device.

13. The one or more computer-readable storage media of claim 1, wherein rendering of the anamorphic image includes at least of:
   employing a printing computing device to prints the anamorphic image; or
   employing a plotter computing device to plot the anamorphic image.

14. The one or more computer-readable storage media of claim 1, wherein the source boundary is a rectangular source boundary that has a source aspect ratio, the anamorphic boundary is a non-rectangular boundary, the set of rendering parameters further characterize a rectangular boundary that has the source aspect ratio, and wherein when the second surface is positioned proximate to a specified location, a reflected image is generated, via a reflection of the anamorphic image from the second surface, the reflected image having the reflected boundary that has the source aspect ratio.

15. A method for rendering images on a planar display surface (DS) that is at least partially characterized by a set of DS properties, the method comprising:
   steps for determining a set of rendering parameters based on a rectangular source boundary of a source image encoded by source image data, the set of DS properties, and a reflective radius of curvature of a reflective surface (RS), the set of rendering parameters characterizing a rendering area of the DS that is bound via a non-rectangular perimeter, wherein the source image visually depicts a scene and the rectangular boundary has a source aspect ratio;

steps for generating anamorphic image data that encodes an anamorphic image of the scene via an application of an image transformation on the source image, the image transformation being based on the set of rendering parameters, wherein the anamorphic image has an anamorphic boundary that is substantially equivalent to the non-rectangular perimeter; and steps rendering the anamorphic image within the rendering area of the DS such that the non-rectangular perimeter bounds the rendered anamorphic image.

16. The method of claim 15, further comprising:

steps for subdividing the source image data into a plurality of the disjoint subsets of the source image data, wherein each of the plurality of disjoint subsets of the source image data encodes a separate portion of the source image such that the source image is subdivided into a plurality of disjoint polygonal patches, and wherein a first subset of the source image data encodes a first polygonal patch of the source image that conforms to a first polygonal sub-boundary of the source boundary;

steps for subdividing the rendering area into a plurality of disjoint non-polygonal patches such that there is a one-to-one mapping between each of the plurality of polygonal patches and each of the plurality of non-polygonal patches, wherein a first non-polygonal patch of the rendering area corresponds to the first polygonal patch of the source image and conforms to a first non-polygonal sub-boundary of the anamorphic boundary; and steps for generating, for each of the plurality of sets of source image data, a deforming transformation, wherein via an application of a first deforming transformation to the first subset of source image data, a corresponding first subset of anamorphic image data is generated encoding a first non-polygonal patch of the anamorphic image that corresponds to the first polygonal patch of the source image and conforms to the first non-polygonal sub-boundary of the anamorphic boundary.

17. The method of claim 15, further comprising:

steps generating a unit curved segment;

steps for performing a plurality of translating, scaling, and rotating operations on the unit curved segment to generate a plurality of Bezier patch control points;

steps for generating a mesh of the rendering area of the DS that is parameterized by the plurality of Bezier control points; and steps for generating the image transformation based on the mesh of the rendering area and the plurality of Bezier control points.

18. A computing system for semantic segmentation, comprising:

a processor device; and a computer-readable storage medium, coupled with the processor device, having instructions stored thereon for rendering images on a planar display surface (DS) that is characterized by a set of DS properties, which, when executed by the processor device, perform actions comprising:

receiving source image data that encodes a source image of a scene and conforms to a polygonal source boundary that is characterized by a source aspect ratio;

determining a set of rendering parameters based on the source boundary, the set of DS properties, and a reflective radius of curvature of a reflective surface (RS), the set of rendering parameters characterizing a rendering area of the DS that is bound via a non-polygonal perimeter;

generating an image transformation based on the set of rendering parameters and the source boundary;

generating anamorphic image data that encodes an anamorphic image of the scene via an application of the image transformation on the source image, the anamorphic image conforming to a non-polygonal anamorphic boundary that is substantially equivalent to the non-polygonal perimeter; and employing the anamorphic image data to cause rendering of the anamorphic image within the rendering area of the DS such that the non-polygonal perimeter bounds the rendered anamorphic image, wherein when the RS is positioned proximate a specified location, the RS reflects the anamorphic image such that a reflected image of the scene is received at a viewing angle and the reflected image conforms to a polygonal reflected boundary that is characterized by the source aspect ratio.

19. The computing system of claim 18, wherein the actions further comprise:

determining an inner radius of the set of rendering parameters based on the radius of curvature of the RS;

determining an outer radius of the set of rendering parameters based on the radius of curvature of the RS and a display width of the set of DS properties;

determining a reflected image height of the reflected image based on the outer radius and the viewing angle;

determining a reflected image width of the reflected image based on the reflected image height and the source aspect ratio such that a reflected aspect ratio of the reflected image is substantially equivalent to the source aspect ratio of the source image; and determining a sweep angle of the set of rendering parameters based on the reflected image width and the radius of curvature of the RS.

20. The computing system of claim 19, wherein the actions further comprise:

in response to determining that the reflected image width is greater than a circumference of the RS, updating the reflected image width to be substantially equivalent to the circumference of the RS;

updating the reflected image height based on the updated reflected image width and the source aspect ratio such that an updated reflected aspect ratio of the reflected image is substantially equivalent to the source aspect ratio of the source image;

updating the outer radius of the set of rendering parameters based on the updated reflected image height and the viewing angle; and updating the sweep angle of the set of rendering parameters based on the updated reflected image width and the radius of curvature of the RS.

* * * * *